United States Patent
Takahashi

(10) Patent No.: US 7,928,725 B2
(45) Date of Patent: Apr. 19, 2011

(54) ROTATIONAL ANGLE DETECTOR AND ROTATIONAL ANGLE DETECTOR INCORPORATED BEARING ASSEMBLY

(75) Inventor: Toru Takahashi, Iwata (JP)

(73) Assignee: NTN Corporation, Osaka (JP)

(*) Notice: Subject to any disclaimer, the term of this patent is extended or adjusted under 35 U.S.C. 154(b) by 399 days.

(21) Appl. No.: 12/225,101

(22) PCT Filed: Mar. 7, 2007

(86) PCT No.: PCT/JP2007/000180
§ 371 (c)(1),
(2), (4) Date: Sep. 12, 2008

(87) PCT Pub. No.: WO2007/105366
PCT Pub. Date: Sep. 20, 2007

(65) Prior Publication Data
US 2010/0225307 A1    Sep. 9, 2010

(30) Foreign Application Priority Data

Mar. 14, 2006  (JP) ................... 2006-068864
Mar. 23, 2006  (JP) ................... 2006-079896
Jul. 28, 2006   (JP) ................... 2006-206921

(51) Int. Cl.
    *G01B 7/30* (2006.01)
(52) U.S. Cl. .................................. 324/207.25
(58) Field of Classification Search .............. None
    See application file for complete search history.

(56) References Cited

U.S. PATENT DOCUMENTS

| 5,721,546 A | 2/1998 | Tsutsumishita |
| 5,783,925 A | 7/1998 | Umemura et al. |
| 7,538,700 B2* | 5/2009 | Nagamoto ............. 341/115 |
| 2010/0066352 A1* | 3/2010 | Takahashi ........... 324/207.25 |

FOREIGN PATENT DOCUMENTS

| JP | 4-172219 | 6/1992 |
| JP | 7-35574 | 2/1995 |
| JP | 8-261794 | 10/1996 |
| JP | 9-265504 | 10/1997 |
| JP | 9-273942 | 10/1997 |
| JP | 2002-139350 | 5/2002 |

(Continued)

OTHER PUBLICATIONS

*International Search Report* (Mailed May 1, 2007 for International Application No. PCT/JP2007/000180).

(Continued)

*Primary Examiner* — Minh N Tang

(57) ABSTRACT

To provide a rotational angle detecting device for securing accurate information on the rotational angle without time lag and a detector incorporated bearing assembly having the rotational angle detecting device, a magnet having an anisotropy in a circumferential direction about the rotation axis is mounted on a rotating member and a magnetic sensor having magnetic sensor elements is arranged on a stationary member so as to confront the magnet. An angle calculating unit for measuring an intensity of magnetic field of the magnet from an output of the magnetic sensor elements and for detecting the rotation angle of the rotating member based on the measured value, and a delay time correcting unit for correcting a delay time between detection of the magnetic field of the magnet by the magnetic sensor elements and output of a detected angle from the angle calculating unit are employed.

14 Claims, 17 Drawing Sheets

FOREIGN PATENT DOCUMENTS

| | | |
|---|---|---|
| JP | 2004-37133 | 2/2004 |
| JP | 2004-239699 | 8/2004 |
| JP | 2005-140737 | 6/2005 |

OTHER PUBLICATIONS

English translation of International Preliminary Report on Patentability mailed on Sep. 25, 2008 and issued in corresponding International Patent Application No. PCT/JP2007/000180.

* cited by examiner

Fig. 10

| A1 | A0 | A-PHASE OUTPUT | B-PHASE OUTPUT |
|----|----|----------------|----------------|
| 0  | 0  | 0              | 0              |
| 0  | 1  | 1              | 0              |
| 1  | 0  | 1              | 1              |
| 1  | 1  | 0              | 1              |

PRIOR ART

ROTATIONAL ANGLE DETECTOR AND ROTATIONAL ANGLE DETECTOR INCORPORATED BEARING ASSEMBLY

CROSS REFERENCE TO RELATED APPLICATIONS

This application claims the benefit under 35 U.S.C. Section 371 of International Application No. PCT/JP2007/000180, filed Mar. 7, 2007, which claimed priority to the following:

Japanese Application No. 2006-068864, filed Mar. 14, 2006;

Japanese Application No. 2006-079896, filed Mar. 23, 2006; and

Japanese Application No. 2006-206921, filed Jul. 28, 2006, in the Japanese Patent Office, the disclosures of which are hereby incorporated by reference.

BACKGROUND OF THE INVENTION

1. Field of the Invention

The present invention relates to a rotational angle detecting device for detecting the angle of rotation in various machines and equipments, for example, for detecting the angle of rotation for the purpose of controlling the rotation of a compact motor and also to a detector incorporated bearing assembly having its rotation detecting device incorporated therein.

2. Description of the Prior Art

A rotational angle detecting device capable of being incorporated in a small size machine or equipment and also capable of detecting the angle of rotation with high accuracy has been suggested, in which a magnetic sensor array is employed. (See, for example, the Japanese Laid-open Patent Publication No. 2004-37133 published Feb. 5, 2004.) In this known rotational angle detecting device, as shown in FIG. 22, the magnetic sensor array 45 including a plurality of magnetic sensor elements (MAGFETs) arranged therein is integrated on a sensor chip 42 together with a circuit 46 including a signal amplifying circuit, an AD converting circuit and a digital signal processing circuit, which sensor chip 42 is in turn arranged in face-to-face relation with a magnet 44 arranged on a rotating member 41. In this case, the magnet 44 is rendered to have an anisotropy in a circumferential direction about the axis of rotation O, and on the sensor chip 42, the magnetic sensor array 45 is arranged along each of the four sides of the imaginary rectangular shape.

With the rotational angle detecting device 43 so constructed as hereinabove described, an output of the magnetic sensor arrays 45 each extending along one of the four sides is read out by the signal amplifying circuit and the AD converting circuit to detect a distribution of magnetic fields developed by the magnet 44 and the angle of rotation of the magnet 44 is subsequently calculated by the digital signal processing circuit based on a result of such detection.

Although the detecting method is different from that used in the rotational angle detecting device 43 of a kind disclosed in the above mentioned Patent Document, a rotation detecting device has also been suggested, in which a plurality of magnetic sensor elements such as Hall elements are employed and the position and the movement of a magnet fixed to a rotatable body are detected by calculating respective output signals of the magnetic sensor elements.

In those rotational angle detecting devices, both of a substantial length of time to read out the respective outputs from the individual magnetic sensor elements and a calculation processing time to determine information on, for example, the angle of rotation from the read-out signals are required and, therefore, a time lag often occurs in a detection signal. For this reason, when the rotational speed of the rotating member is high, a deviation occurs between the actual rotational speed and the rotational angle detected and, therefore, there has been a problem that difficulty is encountered in using in the field of use where precise information on the position of rotation is required in real time. In other words, the operation of the rotational angle detecting device of the construction described above repeats a cycle of measurement of the magnetic field→angle calculation→angle output and, accordingly, angle data are outputted at intervals of a predetermined time corresponding to the cycle. Because of this, a problem has been recognized that the angle data outputted has a time lag corresponding to the length of time required to perform the angle calculation and no accurate information on the angle at the time of observation can be obtained. Also, where the rotation of the motor is to be performed by detecting the angle of rotation and the rotational speed with the use of this rotational angle detecting device, difficulty has been encountered in accurately detecting the angle of rotation and the rotational speed at an arbitrarily chosen time.

SUMMARY OF THE INVENTION

An object of the present invention is to provide a rotational angle detecting device capable of securing an accurate information on the angle of rotation at the time without any time lag and a detector incorporated bearing assembly having the rotational angle detecting device incorporated therein and also to provide a rotational angle detecting device that can be used to detect the angle of rotation of a rotary shaft of, for example, a motor to accurate detect the angle of rotation at an arbitrarily chosen time and a detector incorporated bearing assembly having this rotational angle detecting device incorporated therein.

The rotational angle detecting device of the present invention is a rotational angle detecting device which includes a magnet mounted on a rotating member and having an anisotropy in a circumferential direction about the axis of rotation; a magnetic sensor arranged on a stationary member so as to confront the magnet in a direction along the axis of rotation of the rotating member and having a plurality of magnetic sensor elements arranged in a plane; an angle calculating unit for measuring the intensity of magnetic field of the magnet from an output of each of the magnetic sensor elements and for detecting the angle of rotation of the rotating member based on the measured value; and a delay time correcting unit for correcting a delay time between the detection of the magnetic field of the magnet by the magnetic sensor elements and an output of a detected angle from the angle calculating unit. The magnetic sensor referred to above is made up of, for example, magnetic sensor arrays, but may be in the form of a rotary encoder of a kind utilizing magnetic sensors such as, for example, a plurality of Hall elements and operable to calculate the angle from respective output signals therefrom. It is to be noted that reference to the magnetic generating element "having an anisotropy in the circumferential direction" is intended to element that the intensity of magnetic field varies in the circumferential direction. As a result, when the magnetic generating element rotates together with a rotary shaft, the magnetic field at a fixed point external to the magnetic generating element changes cyclically in proportion to the velocity of rotation.

According to the above described construction, since the detected angle outputted from the angle calculating unit is corrected by the delay time correcting unit by the delay time occurring subsequent to the magnetic field of the magnet being detected by the magnetic sensor elements and before a detected angle being outputted from the angle calculating unit, the angle information so outputted will assume a value extremely near to the actual angle of rotation of the rotating member and, therefore, the accurate angle information can be obtained in a real time.

In the present invention, the magnet may be arranged in, for example, a rotary shaft end of the rotating member and has a pair of magnetic poles formed therein.

In the present invention, an interpolation unit for interpolating an interval of sampling of magnetic fields conducted by the magnetic sensor to calculate an amount of change of an angle and an output unit for outputting a rotational angle which has been corrected as to a delay time by the delay time correcting unit and interpolated by the interpolation unit may be employed. Since by the interpolation unit, the amount of change of the rotational speed is calculated by interpolating the sampling intervals of the magnetic field, a high speed rotating operation of the rotating member can be detected more minutely than the sampling time interval. As a result, there is no error resulting from the time delay and an accurate rotational angle information at each timing can be obtained.

In the present invention, a pulse generating circuit for generating a rotation pulse signal from an output of the magnetic sensor and wherein the output unit outputs the output of the rotational angle in a form of a pulse signal may be employed. Also, the pulse signal may be made up of two rotation pulse signals that are displaced 90° in phase from each other. In addition, it may be made up of a rotation pulse signal and a rotational direction signal. In the case of this construction, the direction of rotation of the rotating member can also be determined.

In the present invention, an index signal generating section for outputting from the output of the magnetic sensor, an index signal for each complete rotation of the rotating member may be employed. In the case of this construction, the absolute rotational angle information can be obtained in real time by counting the pulses.

In the present invention, a storage section for storing an angle value for outputting the index signal may be employed and an angle value setting section for setting the angle value for outputting the index signal may also be employed. With these sections, the index signal generated at any arbitrarily angle can be obtained in a condition in which a delay in calculating time is compensated for. The angle value setting section may be comprised of a communication circuit.

In the present invention, a function ON/OFF unit for selectively switching a function of each of the delay time correcting unit and the interpolation unit on or off may be employed. Also, an automatic switching section for switching the delay time correcting unit on or off in dependence on whether or not the rotational speed of the rotating member is equal to or higher than a predetermined speed, such that when the rotational speed of the rotating member is not higher than the predetermined rotational speed, the delay time correcting unit is switched off, may be employed. The angle value setting section may be comprised of a communication circuit.

In the event that the rotational speed of the rotating member is low, an influence of the delay time in the angle calculating unit is small and, therefore, it may occurs that a stable result of detection can be obtained without the delay time correcting unit being activated to perform a delay time compensating process. In view of this, if in such case, the delay correction is automatically switched on or off by the function ON/OFF unit in dependence on the rotational speed, the delay time compensating process of the delay time correcting unit may be dispensed with and the stable result of detection can be obtained.

In the present invention, the delay time correcting unit may include a rotational speed calculating section for calculating the rotational speed from a time dependent change of the rotational speed detected by the angle calculating unit, and an angle time delay correcting section for correcting a time delay of the rotational angle between detection of the magnetic field by the magnetic sensor and an output of the rotational angle from the angle calculating unit, in reference to the rotational speed calculated by this rotational speed calculating section. The output from the angle calculating unit that detects the rotational angle of the rotary shaft from the output of the magnetic sensor involves a delay in time subsequent to the time, at which the magnetic sensor samples the magnetic field of the magnet and before the time at which the rotational angle is calculated and outputted. For this reason, the actual rotational angle of the rotary shaft when the data on the rotational angle have been read in will possibly differ from the data read in. Accordingly, based on the rotational speed calculated by the rotational speed calculating section from the time dependent change of the rotational angle detected by the angle calculating unit, the rotational speed calculating section corrects the delay in time of the rotational angle detected by the angle calculating unit. In this way, an accurate angle of rotation of the rotary shaft can be detected.

In the present invention, a rotational angle conjecturing unit may be employed for obtaining the rotational angle, which has been corrected by the angle time delay correcting section, at intervals of a predetermined time and for conjecturing the rotational angle of the rotary shaft at any arbitrarily chosen time based on a rotational angle information at the intervals of the predetermined time information on the rotational angle calculated by the rotational speed calculating section.

The rotational angle date corrected by the angle time delay correcting section are discrete data outputted at intervals of the predetermined time and, therefore, no angle information can be obtained more minutely than the interval during which the data are updated. Accordingly, the rotational angle conjecturing unit conjectures the angle value at the timing at which the rotational angle data are requested from the rotational angle data and the rotational speed and then conjectures the rotational angle at any arbitrary timing. In this way, the rotational angle at any arbitrary timing can be detected accurately.

In the present invention, a large scale integrated circuit forming the magnetic sensor may be employed, in which the angle calculating unit, the rotational speed calculating section and the angle time delay correcting section are all integrated on such large scale integrated circuit. In the case of this construction, the rotational angle data outputted from the semiconductor chip where the large scale integrated circuit is integrated represents the rotational angle at such time and, accordingly, for the control of various machines that operate in response to receipt of those data, the rotational angle detecting device can be rendered to be easy to handle.

A detector incorporated bearing assembly of the present invention is the one, in which a rotational angle detecting device of the present invention is incorporated in a bearing assembly including rolling elements interposed between a rotating member and a stationary member. According to this construction, the number of component parts and the number of assembling steps can be reduced and downsizing can be achieved.

A motor rotation control device of the present invention is the one, in which a rotation angle detecting device of the present invention and a control circuit for controlling in response to an output of the rotational angle detecting device and indicative of a rotational angle to control an energizing current and an energizing timing for a motor are employed. According to this construction, the control of rotation of the motor can be carried out with high accuracy. In particular, where the rotational angle conjecturing unit is employed, it is possible to accurately ascertain the position of the magnetic poles of the motor at any arbitrarily chosen timing and, therefore, minute control appropriate to the rotational speed and the angle of rotation of the rotor can be effective where, for example, the efficiency of the motor and/or is desired to be increased and/or sounds of rotation are desired to be suppressed. In such case, a highly accurate detection of the angle can be accomplished with the compact rotational angle detecting device and the device can be downsized and can have an increased performance.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 10 is a logic diagram showing AB signals outputted from an output unit employed in the rotational angle detecting device;

DETAILED DESCRIPTION OF THE EMBODIMENTS

Figure 1:
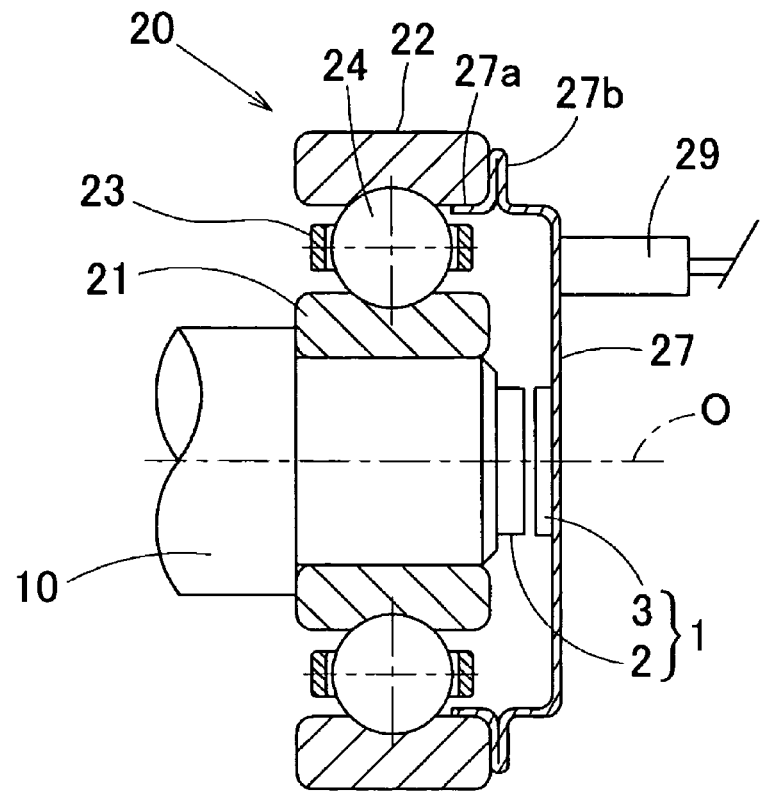
FIG. 1 is a sectional view of a detector incorporated bearing assembly having a rotational angle detecting device according to a first preferred embodiment of the present invention incorporated therein.

A first preferred embodiment of the present invention will be described with particular reference to FIGS. 1 to 9. FIG. 1 illustrates a sectional view of a bearing assembly, in which a rotation detecting device according to the first embodiment is incorporated. This detecting device incorporated bearing assembly 20 is in the form of a rolling bearing assembly, in which rolling elements 24 retained by a retainer 23 are interposed between an inner race 21 and an outer race 22. The rolling elements 24 are in the form of balls and this rolling bearing assembly 20 is rendered to be a single row deep groove ball bearing. The inner race 21 has a rotary shaft 10, which is a rotating member, press-fitted thereinto, and the outer race 22 is arranged in a housing (not shown) of a machine utilizing the bearing assembly.

The rotation detecting device 1 incorporated in the rolling bearing assembly 20 includes a magnet 2 arranged on the side of the inner race 21 of the rolling bearing assembly 20, and a rotation sensor 3 arranged on the side of the outer race 22. More specifically, the permanent magnet 2 having a pair of magnetic poles N and S formed therein is arranged on the rotary shaft 10 that rotates together with the inner race 21, and the rotation sensor 3 is arranged on a sensor carrier member 27 that is held in fixed relation with the outer race 22.

Figure 2:
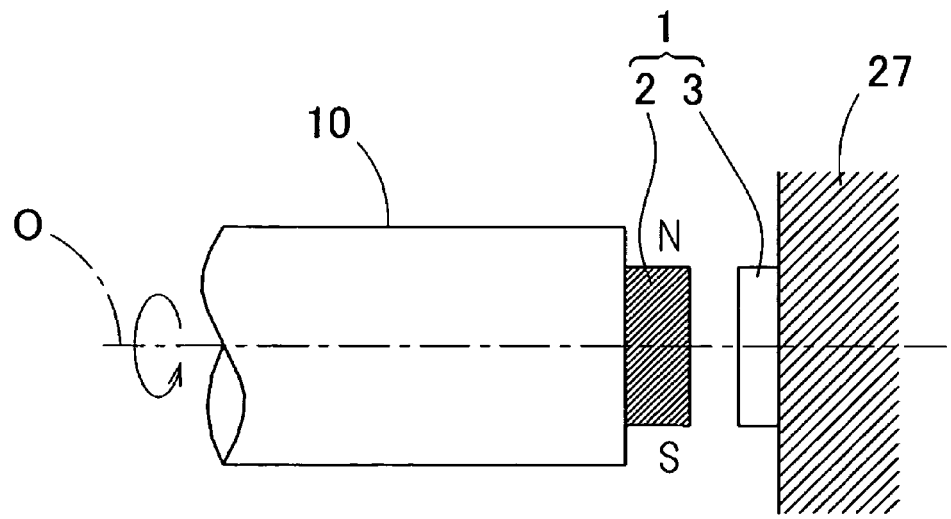
FIG. 2 is an enlarged side view showing the manner of installation of the rotational angle detecting device in the bearing assembly.

As shown in FIG. 2, the magnet 2 is of a type in which magnetism generated from the pair of the magnetic poles N and S has directionality around the longitudinal axis O of the rolling bearing assembly 20. This magnet 2 is fixed coaxially to one end of the rotary shaft 10 with the longitudinal axis O of the rolling bearing assembly 20 aligned with the geometric center of the magnet 2. As the magnet 2 rotates together with the rotary shaft 10, the magnetic poles N and S revolve about the bearing longitudinal axis O.

The rotation sensor 3 is a sensor for detecting magnetism emanating from the magnet 2 and then outputting information on the angle of rotation. This rotation sensor 3 is fitted to the outer race 22 through the sensor carrier member 27 so as to confront the magnet 2 in a direction along the longitudinal axis O of the rolling bearing assembly 20. More specifically, the sensor carrier member 27 is fitted to the outer race 22 and the rotation sensor 3 is then fixed to the sensor carrier member 27. The sensor carrier member 27 has an outer periphery formed with a cylindrical body 27a capped into an inner diametric surface of the outer race 22 and axially positioned while a collar portion 27b formed in the cylindrical body 27a so as to protrude radially outwardly is engaged with an end face of the outer race 22. Also, the sensor carrier member 27 has an output cable 29 fitted thereto so that an output from the rotation sensor 3 can be supplied therethrough to an external circuit.

Figure 3:
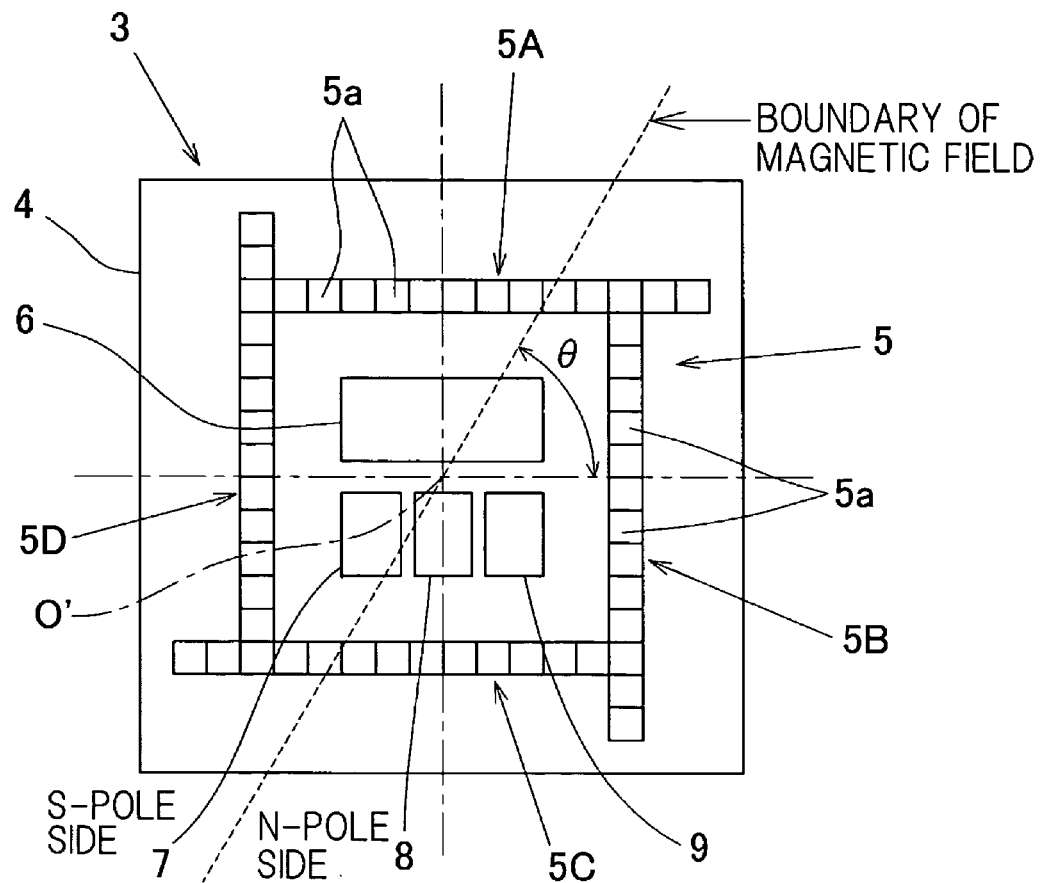
FIG. 3 is a plan view of a semiconductor chip forming an example of a rotation sensor in the bearing assembly.

As shown in a plan view in FIG. 3, the rotation sensor 3 is formed by integrating a large scale integrated circuit (LSI) on a single semiconductor chip 4. The large scale integrated circuit includes a plurality of magnetic sensor elements 5a forming a magnetic sensor 5, an angle calculating unit 6 for measuring the intensity of magnetic field of the magnet 2 from outputs of the magnetic sensor elements 5a and for detecting the angle of rotation of the rotary shaft 10, which is the rotating member, based on the measured value, a delay time correcting unit 7, an interpolation unit 8 and an output unit 9. It is to be noted that in FIG. 3, a conceptual construction of each of the angle calculating unit 6, the delay time correcting unit 7, the interpolation unit 8 and the output unit 9 is shown in the form of a block and neither the shape nor the dimension of each of those units 6 to 9 is not shown. On the semiconductor chip 4, the magnetic sensor elements 5a are so arranged as to form four magnetic sensor arrays 5A to 5D laid so as to extend along respective four sides of the imaginary rectangular shape. In such case, the geometric center O' of the imaginary rectangular shape coincides with the longitudinal axis O of the rolling bearing assembly 20. Each of the four magnetic sensor arrays 5A to 5D is shown having the sensor elements 5a arranged in a row in the illustrated embodiment, but it may have the sensor elements 5a arranged in a plurality of parallel rows. A calculating circuit segment including the angle calculating unit, the delay time correcting unit 7, the interpolation unit 8 and the output unit 9 is arranged inside the rectangular arrangement of the magnetic sensor arrays 5A to 5D. The semiconductor chip 4 has a surface, on which the elements are formed and is fixed to the sensor carrier member 27 with such surface facing towards the magnet 2.

As hereinabove described, when the magnetic sensor elements 5a and the calculating circuit segment (the angle calculating unit 6, the delay time correcting unit 7, the interpolation unit 8 and the output unit 9) are integrated together on the same semiconductor chip 4, no wiring is required between the magnetic sensor elements 5 and the calculating circuit segment and, therefore, not only can the rotation sensor 3 be assembled compact, but the reliability against disconnection can be increased and the assemblage of the rotation detecting device 1 can also be facilitated. In particular, positioning of the calculating circuit segment inside the rectangular arrangement of the magnetic sensor arrays 5A to 5D is effective to allow the chip to be reduced in size.

Figure 4:
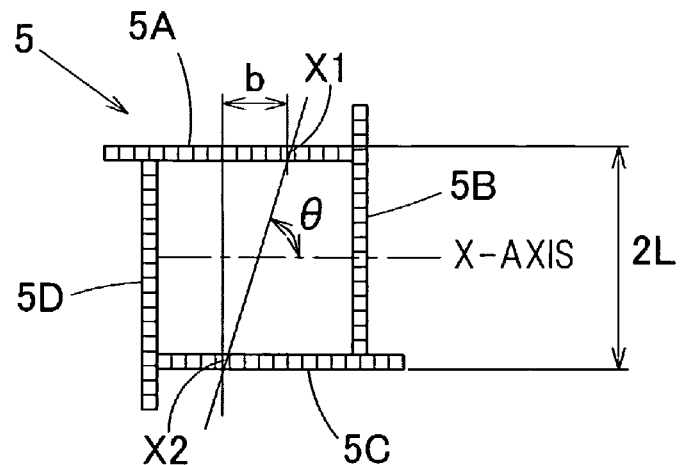
FIG. 4 is an explanatory diagram showing an angle calculating process performed by an angle calculating unit of the rotation sensor.
Figure 5:
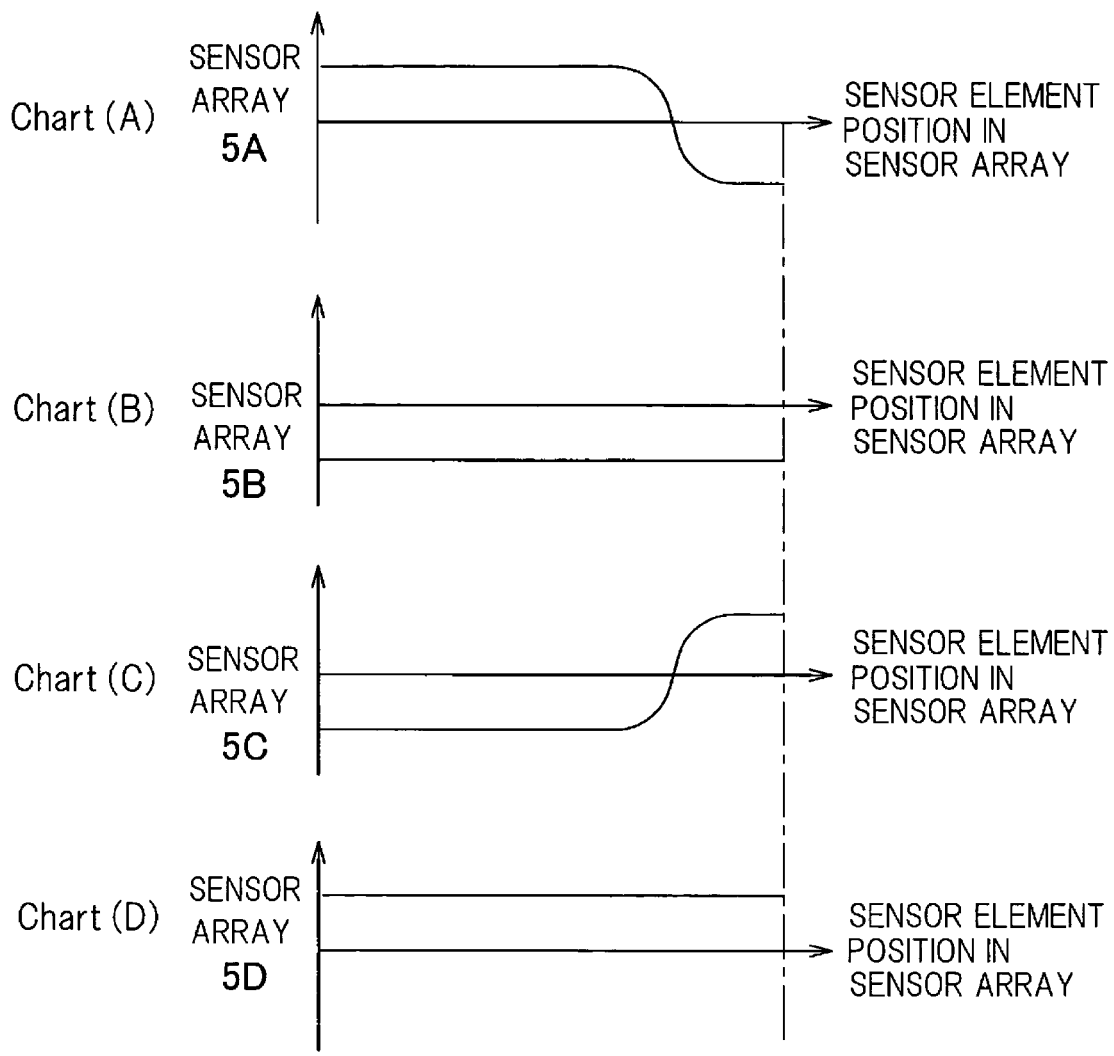
FIG. 5 is a diagram showing waveforms of respective outputs from magnetic sensor arrays employed in the rotation sensor.

FIGS. 4 and 5 illustrate explanatory diagram showing a rotational angle calculating process performed by the angle calculating unit 6. Charts (A) to (D) in FIG. 5 show respective output waveforms of the magnetic sensor arrays 5A to 5D when the rotary shaft 10 rotates, in which the axis of abscissa represents the magnetic sensor elements 5a of each of the magnetic sensor arrays 5A to 5D and the axis of ordinates represents the detected magnetic field.

Let it be assumed that the zero crossing position, which is the boundary between the N magnetic pole and the S magnetic pole of the detected magnetic fields of the magnetic sensor arrays 5A to 5D lies at positions X1 and X2 as shown in FIG. 4. In this condition, the respective outputs of the magnetic sensor arrays 5A to 5D represent such signal waveforms as shown in Charts (A) to (D) in FIG. 5. Accordingly, the zero crossing positions X1 and X2 can be calculated from the respective outputs of the magnetic sensor arrays 5A and 5C by means of a linear approximation.

The angle calculation can be carried out by the following equation (1):

$$\theta = \tan^{-1}(2L/b) \quad (1)$$

where θ represents the angle of rotation of the magnet 2 expressed in terms of the absolute angle (absolute value), 2L represents the length of each of the four sides depicted by the magnetic sensor arrays 5A to 5D arranged in the rectangular pattern, and b represents the transverse length between the zero crossing positions X1 and X2.

Where the zero crossing positions X1 and X2 lie on the magnetic sensor arrays 5B and 5D, the angle of rotation θ can be calculated in a manner similar to that described above, using the data on the zero crossing positions that are obtained from the respective outputs of those magnetic sensor arrays 5B and 5D.

Figure 9:
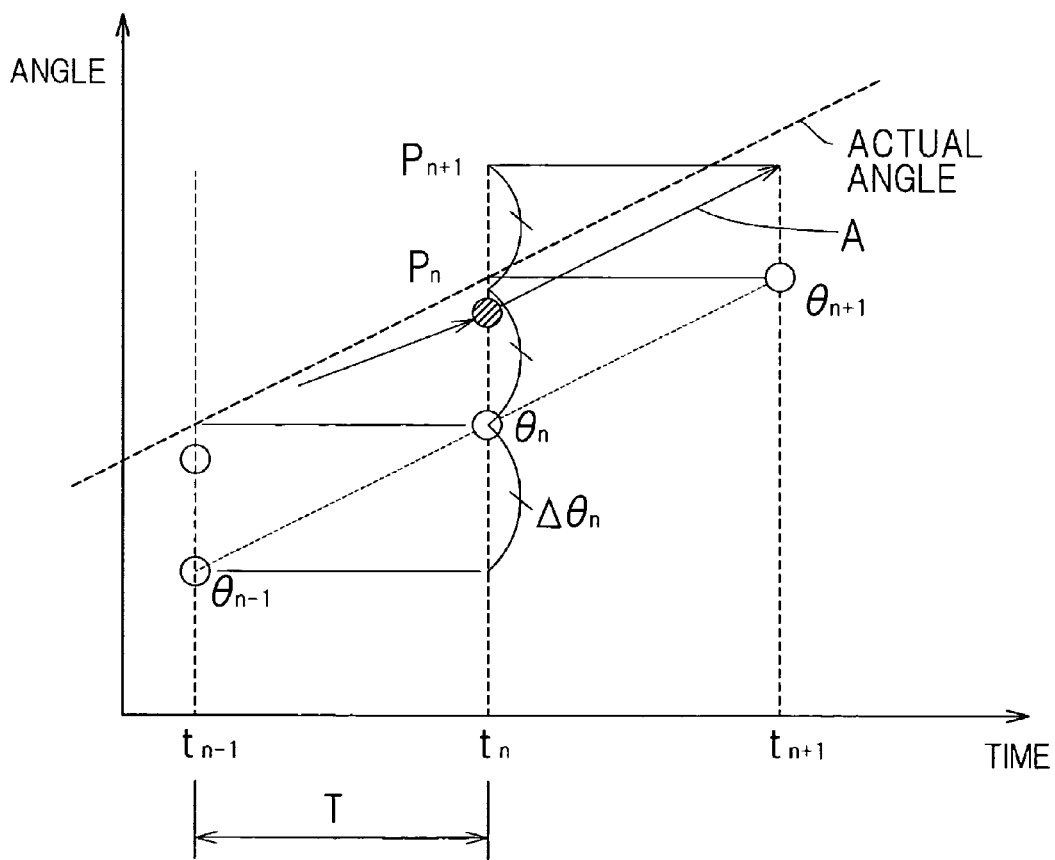
FIG. 9 is an explanatory diagram showing a processing operation performed by the delay time correcting unit employed in the rotational angle detecting device.

In the meantime, a time lag tends to occur between to the start of calculation performed by the angle calculating unit 6 and an output of the angle of rotation θ. Accordingly, in a high speed rotating condition, the position of the rotational angle detected may differ from the actual position of the rotational angle. FIG. 9 illustrates the relation between the detected angles $\theta_{n-1}$, $\theta_n$ and $\theta_{n+1}$, which are calculated and outputted by the angle calculating unit 6 at respective timings $t_{n-1}$, $t_n$, and $t_{n+1}$ and the actual angles. Differences in angle between those detected angles $\theta_{n-1}$, $\theta_n$ and $\theta_{n+1}$ and the actual angles are caused by the above described time lag.

Figure 6:
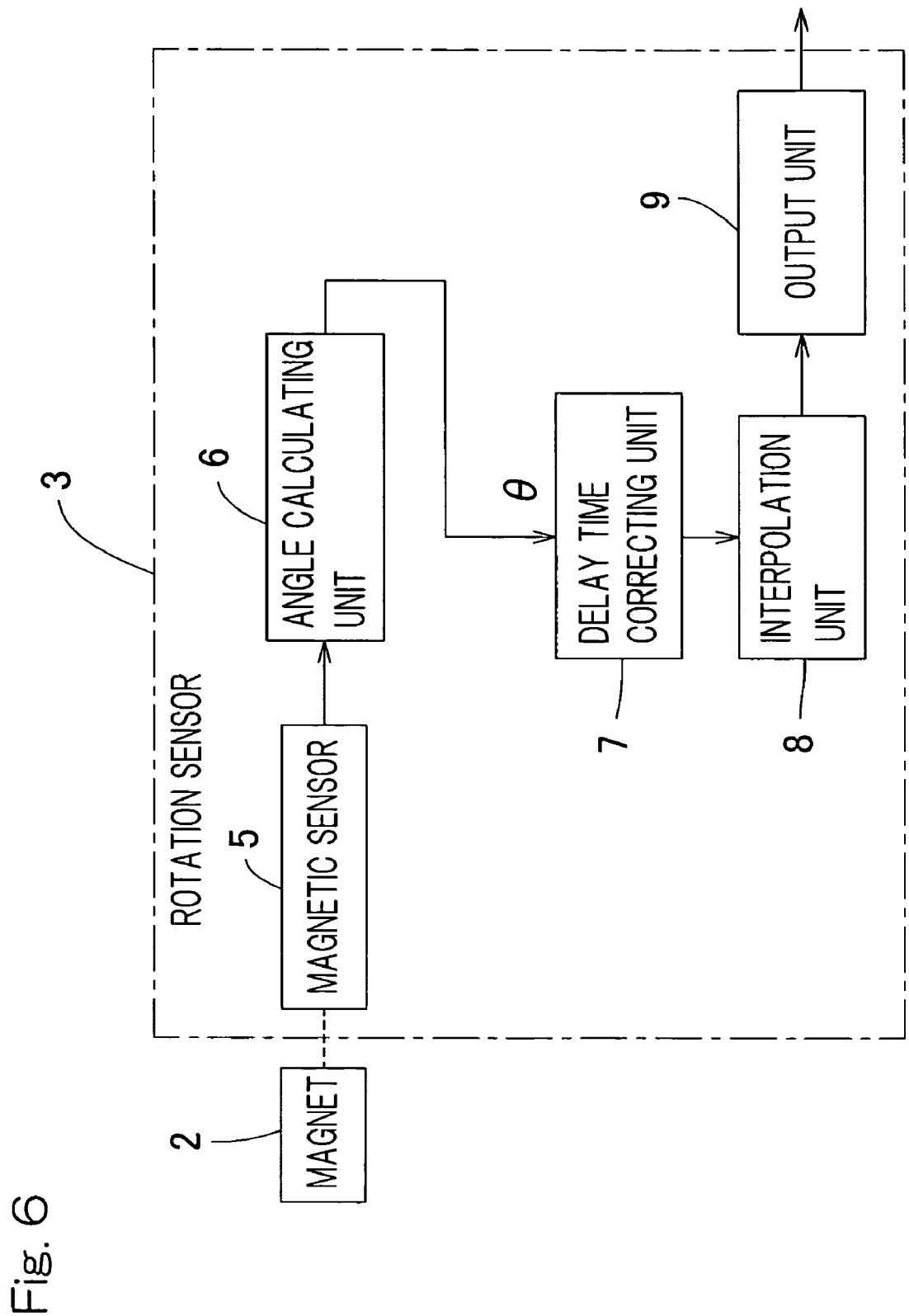
FIG. 6 is a block diagram showing a schematic construction of the rotational angle detecting device.
Figure 7:
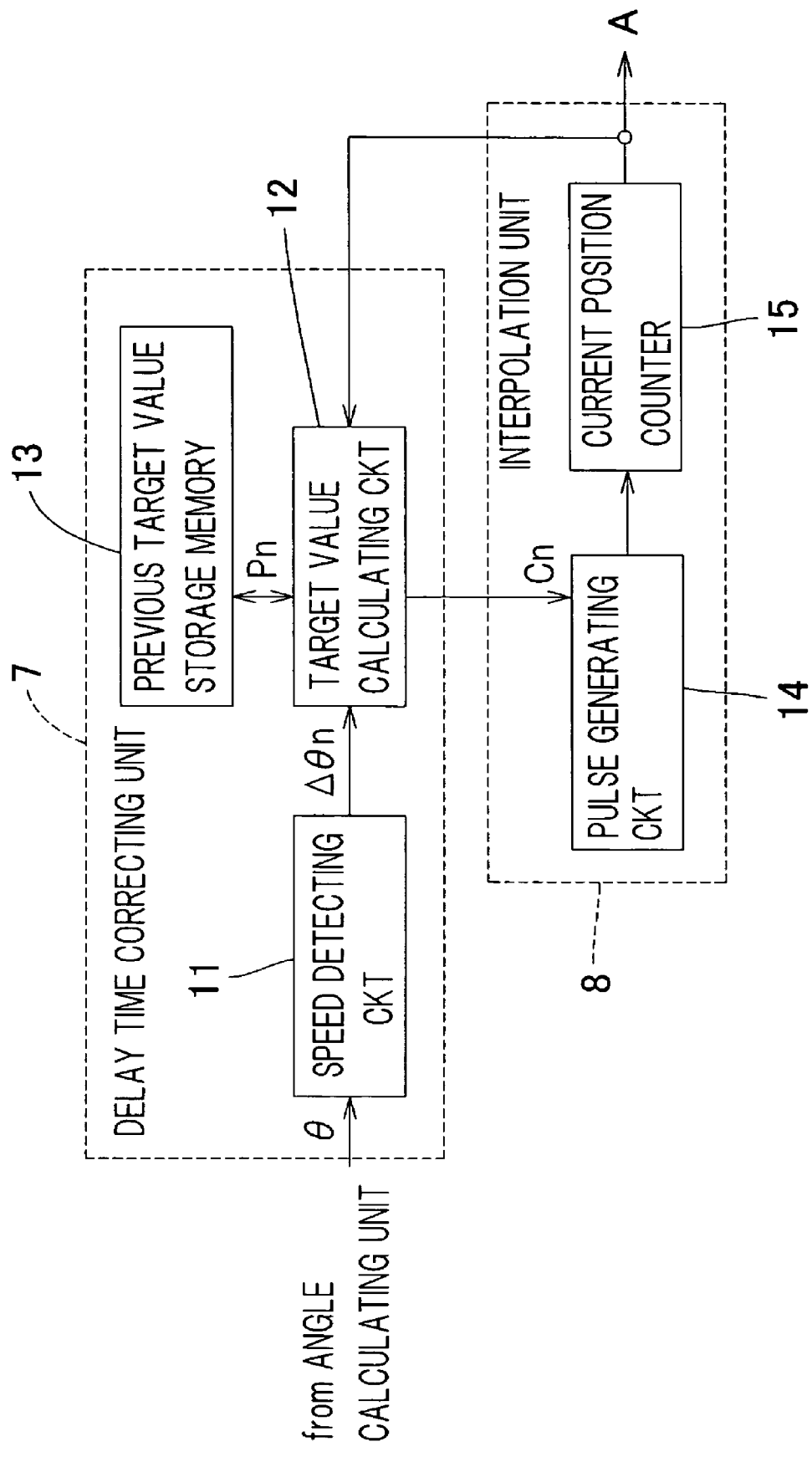
FIG. 7 is a block diagram showing a detailed construction of a delay time correcting unit and an interpolation unit both employed in the rotational angle detecting device.
Figure 8:
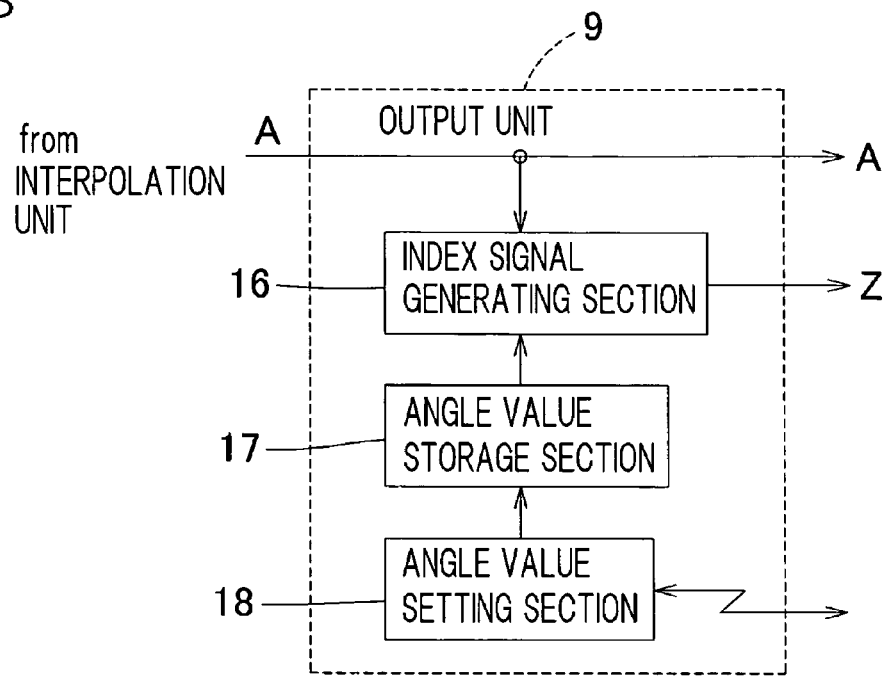
FIG. 8 is a block diagram showing a detailed construction of an output unit employed in the rotational angle detecting device.

In FIG. 6, a schematic construction of the rotation detecting device 1 according to this first preferred embodiment is shown in a block diagram. The delay time correcting unit 7 corrects the detected angle θ, outputted from the angle calculating unit 6, by a quantity corresponding to the time lag referred to above. As shown in FIG. 7 showing a block diagram of the detailed construction, this delay time correcting unit 7 includes a speed detecting circuit 11, a target value calculating circuit 12 and a previous target value storage memory 13.

In the speed detecting circuit 11, the difference $\Delta\theta_n$ between the detected angle $\theta_n$ outputted from the angle calculating unit 6 at the timing $t_n$ and the detected angle $\theta_{n-1}$ outputted from the angle calculating unit 6 at the timing $t_{n-1}$ is calculated as a rotational speed. This difference $\Delta\theta_n$ represents the angle of rotation that takes place at one magnetic field sampling time interval T. Since variation of the difference $\Delta\theta_n$ becomes large, an averaging filter or the like may be employed as required.

In the target value calculating circuit 12, using the rotational speed (the difference $\Delta\theta_n$) so detected by the speed detecting circuit 11, the position $P_{n+1}$ of the rotational angle that is to be attained at the next sampling timing (the timing at which the angle calculating unit 6 subsequently outputs a detected angle $\theta_{n+1}$) $t_{n+1}$ is calculated. In the instance now under discussion, the target value calculating circuit 12 compensates for the delay time up until the outputting of the detected angle. By using a primary approximation as a method of calculating the compensation, the position $P_{n+1}$ of the rotational angle that is to be attained at the timing $t_{n+1}$ can be expressed by the following equation (2):

$$P_{n+1} = \theta_n + \alpha \cdot \Delta\theta_n \quad (2)$$

where α represents a coefficient necessary to compensate for the delay time that can be set depending on the length of the delay time and which may be equal to 2 in the instance shown in FIG. 9. The expected detected angle $P_{n+1}$ so determined becomes a target value. Where the compensation for the delay time is carried out in this manner, $P_{n+1}$ will assume such a position as shown in FIG. 9 and a value approximating to the actual position of the rotational angle will become a target value. At this time, the target value $P_n$ previously calculated by the target value calculating circuit 12 is stored in the target value storage memory 13.

The interpolation unit 8 calculates the amount of change of the rotational angle by interpolating the sampling time interval T of the magnetic field. This interpolation unit 8, the detailed construction of which is shown in a block diagram in FIG. 7, includes a pulse generating circuit 14 and a current position counter 15. In the previous target value calculating circuit 12, using the target value $P_{n+1}$ determined as hereinbefore described and the previous target value $P_n$ stored in the target value storage memory 13, the count $C_n$ that has to change by the time of the next sampling timing $t_{n+1}$ is determined by the following equation (3) and is then inputted to the pulse generating circuit 14 of the interpolation unit 8:

$$C_n = P_{n+1} - P_n \quad (3)$$

Also, the target value calculating circuit 12 stores the current position A as $P_n$ in the previous target value storage memory 13 again after the calculation of the count $C_n$. Then, clocks in a number equal to $C_n$ are successively inputted to the current position counter 15. In this way, the count of the current position counter 15 changes and the corrected angle output (delay time compensation+interpolation) A can be obtained.

Although the angle output signal A so interpolated is a digital signal, the operation takes place in which it merely changes at all times by ±1. Accordingly, from a signal condition of low two bits of the count (signal A) of the current position counter 15, a two-phase pulse signal such as an AB phase generally employed in the standard encoder can be generated.

By way of example, assuming that the low two bits of the signal A is A0 and A1, the signal of the AB phase can be generated by a logic circuit shown in FIG. 10.

The output unit 9 outputs a rotational angle A to which the delay time compensation has been applied by the delay time correcting unit 7 and the interpolation has also been applied by the interpolation unit 8. This output unit 9, the detailed construction of which is shown in a block diagram in FIG. 8, includes an index signal generating section 16, an angle value storage section 17, and an angle value setting section 18. The output unit 9 has, in addition to a terminal from which the angle signal A from the interpolation unit 8 is outputted as it stands, a terminal from which an index signal Z is outputted each time the rotary shaft 10, which is the rotating member, undergoes one complete rotation. The index signal generating section 16 outputs the index signal Z to that terminal when the count (signal A) of the current position counter 15 in the interpolation unit 8 attains, for example, zero. The angle value storage section 17 is a memory for storing the angle value at which the index signal Z is outputted, and the angle value setting section 18 sets the angle value to be stored in the angle value storage section 17. The angle value setting section is comprised of, for example, a communication circuit and, therefore, the angle value to be stored in the angle value storage section 17 can be variably set from the outside. Accordingly, when the count (signal A) of the current position counter 15 in the interpolation unit 8 comes to be equal to the angle value stored in the angle value storage section 17, the index signal Z is outputted to the output terminal of the index signal generating section 16. Since the signal A is a signal to which the delay time compensation and the interpolation have been applied, the index signal having a minimized difference from the actual angle can be outputted.

As hereinabove described, with the rotation detecting device 1 according to the foregoing first embodiment, since the detected angle θ outputted from the angle calculating unit 6 is corrected by the delay time correcting unit 7 by a quantity corresponding to the delay time subsequent to the detection of the magnetic field of the magnet 2 with the magnetic sensor elements 5a and before the detected angle θ is outputted by the angle calculating unit 6, the angle information outputted can represent a value extremely near to the actual angle of rotation of the rotating member (the rotary shaft 10) and, accordingly, the accurate angle information can be obtained in real time.

Also, since the amount of change of the rotational angle is calculated by the interpolation unit 8 by interpolating the magnetic field sampling time interval T, a high speed rotation of the rotating member (the rotary shaft 10) can be detected more minutely than the sampling time interval T.

Also, since in this first embodiment, the two phase signals are generated from the angle signal A interpolated and outputted by the interpolation unit 8, the direction of rotation of the rotating member (the rotary shaft 10) can also be determined using those signals.

Yet, since in this first embodiment, the index signal Z can also be outputted by the index signal generating section 16, the information on the absolute angle of rotation can also be obtained in real time by counting the pulses.

In the detector incorporated bearing assembly 20 shown in and described with particular reference to FIG. 1, the rotation detecting device 1 is incorporated in the rolling bearing assembly 20 and, accordingly, the number of component parts of the machine utilizing the rolling bearing assembly and the number of assembling steps can be reduced to achieve downsizing.

Figure 11:
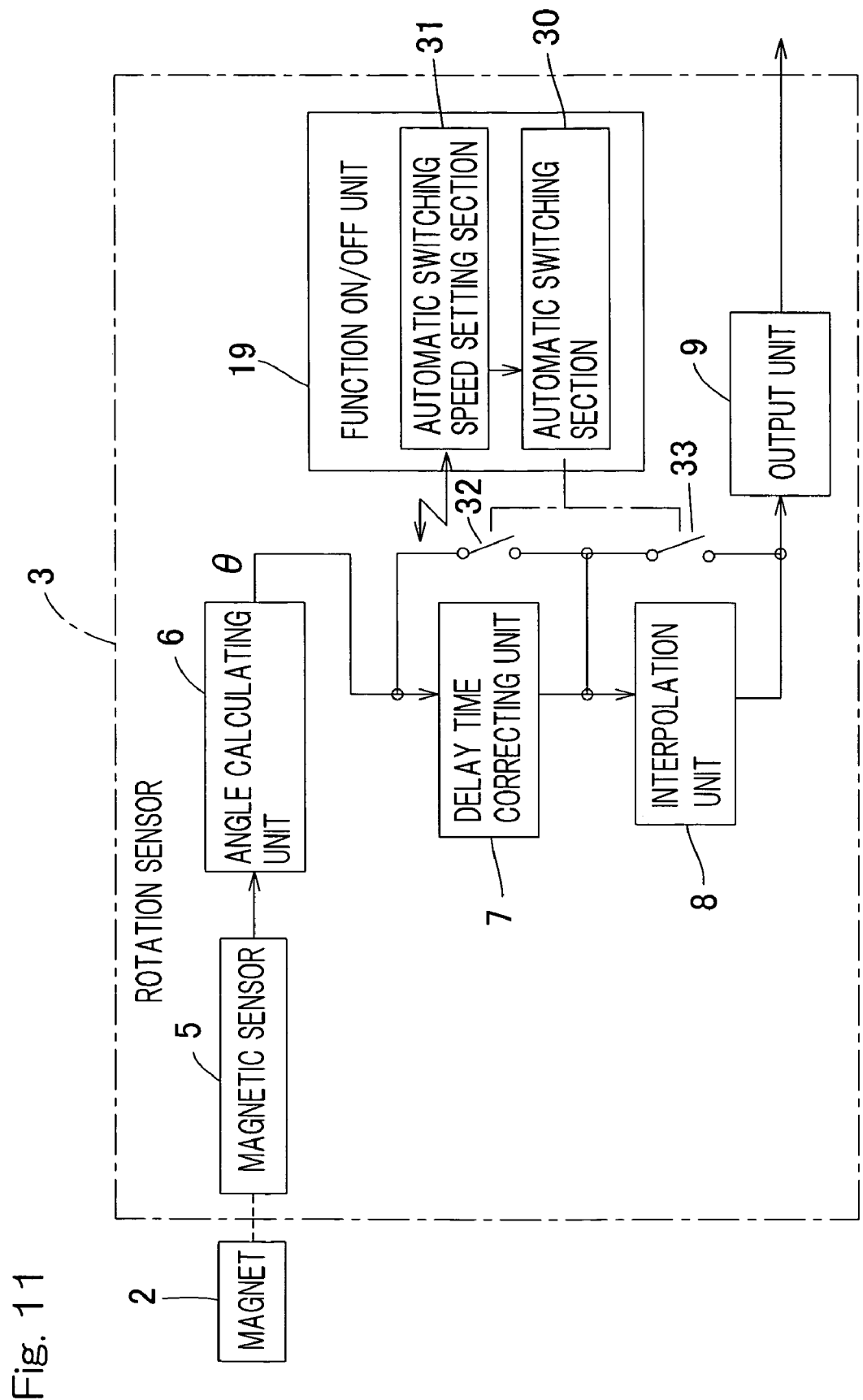
FIG. 11 is a block diagram showing a schematic construction of the rotational angle detecting device according to a second preferred embodiment of the present invention.

FIG. 11 illustrates a second preferred embodiment of the present invention. The rotation detecting device according to this second embodiment is similar to that shown in and described in connection with the previous embodiment with reference to FIG. 6, but differs therefrom in that a function ON/Off unit 19 is additionally employed for selectively switching on or off the function of each of the delay time correcting unit 7 and the interpolation unit 8. The function ON/OFF unit 19 includes an automatic switching section 30 and an automatic switching speed setting section 31.

The automatic switching section 30 is operable to switch switches 32 and 33 on or off to selectively switch the function of each of the delay time correcting unit 7 and the interpolation unit 8 on or off in dependence on whether or not the rotational speed of the rotating member (the rotary shaft 10) is equal to or higher than a predetermined rotational speed and, more specifically, operable to switch the respective functions of the delay time correcting unit 7 and the interpolation unit 8 off when the rotational speed of the rotating member is not equal to the predetermined rotational speed. Although in FIG. 11, for the sake of brevity, the switches 32 and 33 external to the delay time correcting unit 7 and the interpolation unit 8 are shown as employed to selectively switch on or off the functions of them, respectively, arrangement may be made so that respective operation of internal circuits of the delay time correcting unit 7 and the interpolation unit 8 can be switched on or off.

The automatic switching speed setting section 31 variably sets the value of the predetermined rotational speed at which the automatic switching section 30 performs the automatic switching and is comprised of, for example, a communication circuit. It is to be noted that variable setting of the value of the predetermined rotational speed may be performed by, for example, manipulating a switch terminal from the outside, other than that described above. Other structural features of this second embodiment are similar to those shown in and described with reference to FIG. 6 and, therefore, the details thereof are not reinstated.

In the event that the rotational speed of the rotating member (the rotary shaft 10) is low, an influence of the delay time in the angle calculating unit 6 is small and, therefore, it may occurs that a stable result of detection can be obtained without the delay time correcting unit 7 being activated to perform a delay time compensating process. In the rotation detecting device 1 according to this embodiment, since the delay correction is automatically switched on or off by the automatic switching section 30 of the function ON/OFF unit 19 in dependence on the rotational speed, in such case the delay time compensating process of the delay time correcting unit 7 may be dispensed with and the stable result of detection can be obtained.

It is to be noted that where the function of the delay time correcting unit 7 is switched off, the rotational angle position $P_{n+1}$ that is to be attained at the next sampling time $t_{n+1}$ at which the angle calculating unit 6 outputs the detected angle $\theta_{n+1}$ can be calculated by the following equation (2'):

$$P_{n+1} = \theta_n + \Delta\theta_n \qquad (2')$$

Figure 12:
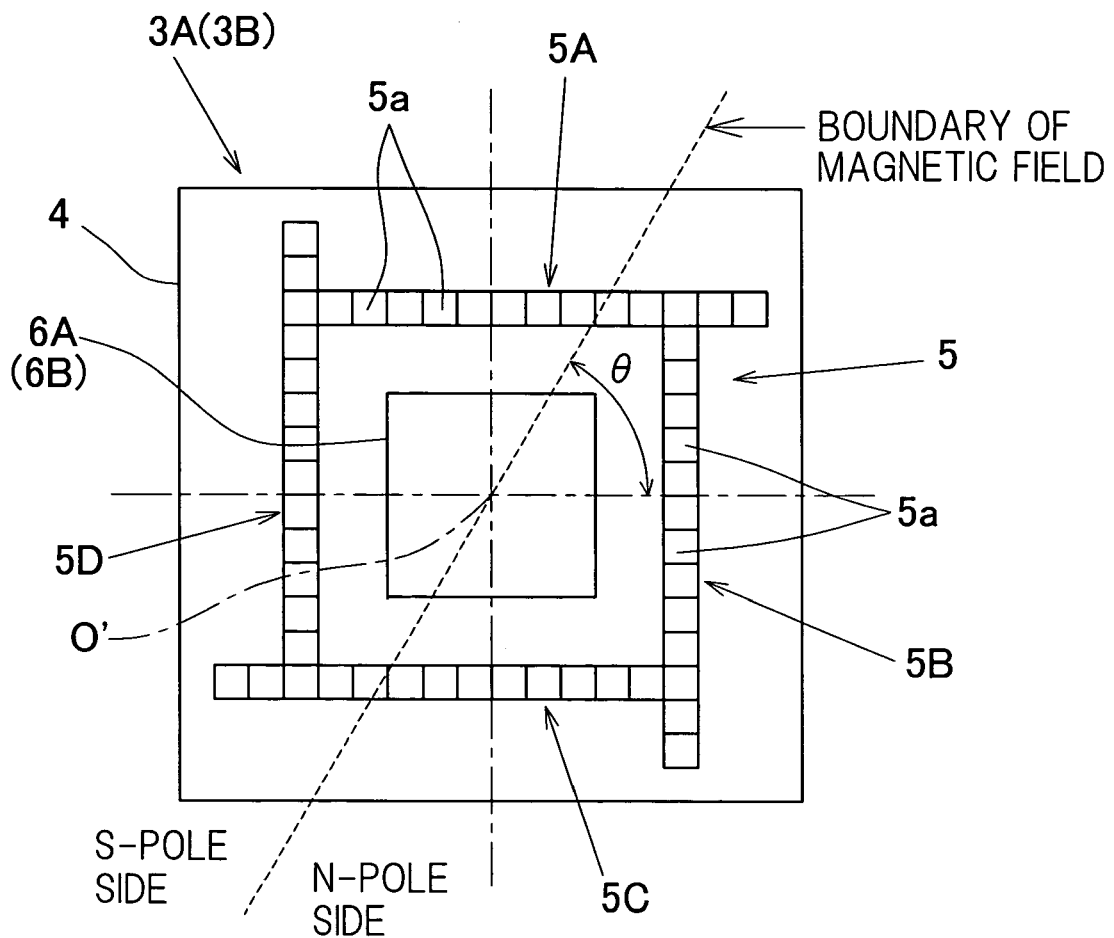
FIG. 12 is a plan view showing the semiconductor chip forming an example of a rotation sensor employed in a detector incorporated bearing assembly having the rotational angle detecting device according to a third preferred embodiment of the present invention incorporated therein.
Figure 14:
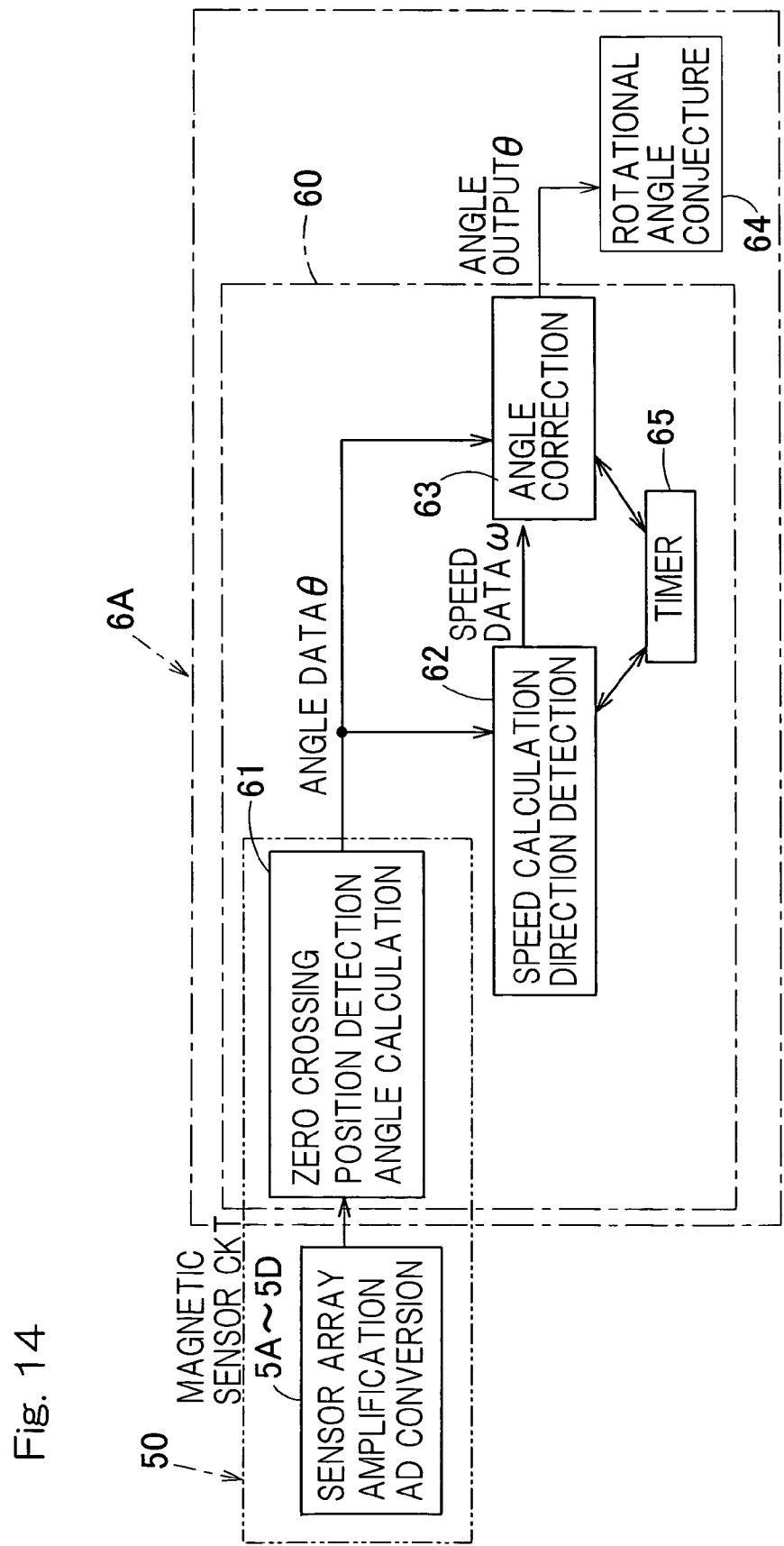
FIG. 14 is a block diagram showing a portion of a circuit construction of the rotation sensor.

FIG. 12 illustrates a plan view of the semiconductor chip forming an example of the rotation sensor 3A employed in the detector incorporated bearing assembly having the rotational angle detecting device according to a third preferred embodiment of the present invention. FIG. 14 is a block diagram showing a portion of the circuit construction of the rotation sensor 3A. As is the case with to the rotation sensor 3 according to the previously described first embodiment, the rotation sensor 3A shown in FIG. 12 is constructed with a large scale integrated circuit (LSI) integrated on a single semiconductor chip 4. The large scale integrated circuit includes a plurality of magnetic sensor elements 5a forming respective parts of the magnetic sensor 5, and a calculating circuit segment 6A for calculating and outputting the rotational angle from outputs of the magnetic sensor elements. On the semiconductor chip 4, the magnetic sensor elements 5a are so arranged as to form four magnetic sensor arrays 5A to 5D laid so as to extend along respective four sides of the imaginary rectangular shape. In such case, the geometric center O' of the imaginary rectangular shape coincides with the longitudinal axis O of the rolling bearing assembly 20. Each of the four magnetic sensor arrays 5A to 5D is shown having the sensor elements 5a arranged in a row in the illustrated embodiment, but it may have the sensor elements 5a arranged in a plurality of parallel rows. The calculating circuit segment 6A is arranged inside the rectangular arrangement of the magnetic sensor arrays 5A to 5D. The semiconductor chip 4 is fixed to the sensor carrier member 27 with such surface facing towards the magnet 2.

Figure 15:
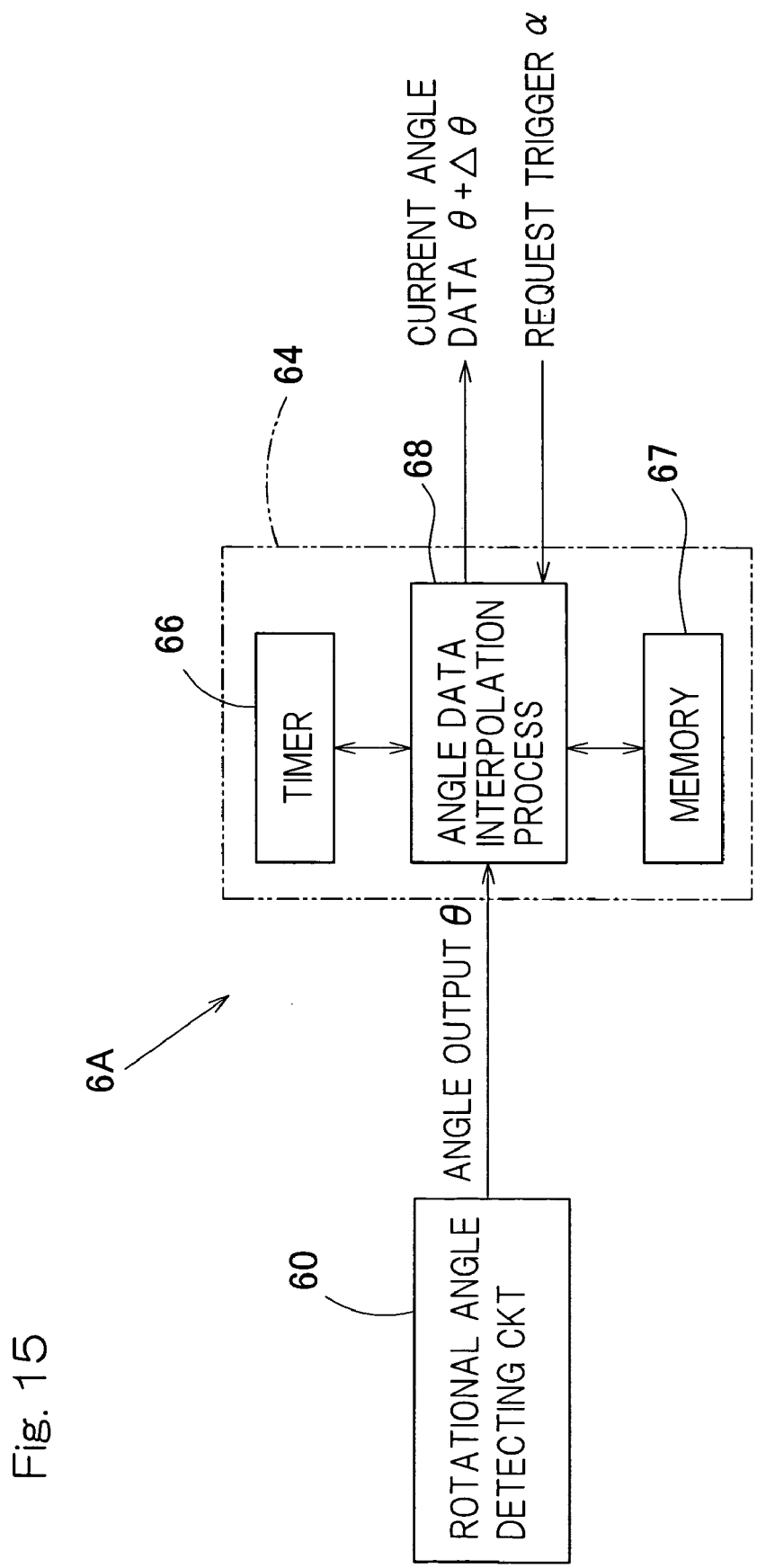
FIG. 15 is a block diagram showing a rotational angle conjecturing unit employed in the rotation sensor.

The calculating circuit segment 6A includes an angle calculating unit 61, a rotational speed calculating section 62, an angle delay time correcting unit 63 (FIG. 14) and a rotational angle conjecturing unit 64 (FIG. 15). The angle calculating unit 61 is operable to calculate the angle of rotation of the rotary shaft 10 from an output of the magnetic sensor 5. The rotational speed calculating section 62 is operable to calculate the rotational speed in reference to a time dependent change of the rotational angle calculated by the angle calculating unit 61 and also to detect the direction of rotation. The angle time delay correcting section 63 is operable to compensate the time delay of the rotational angle subsequent to the detection of the magnetic field by the magnetic sensor 5 and before the rotational angle is outputted by the angle calculating unit 61. The rotational angle conjecturing unit 64 is operable to conjecture the rotational angle of the rotary shaft 10 based on the rotational angle information for a predetermined time and the information on the rotational speed calculated by the rotational speed calculating section 62 by obtaining for each predetermined time the rotational angle corrected by the angle time delay section 63.

Figure 13:
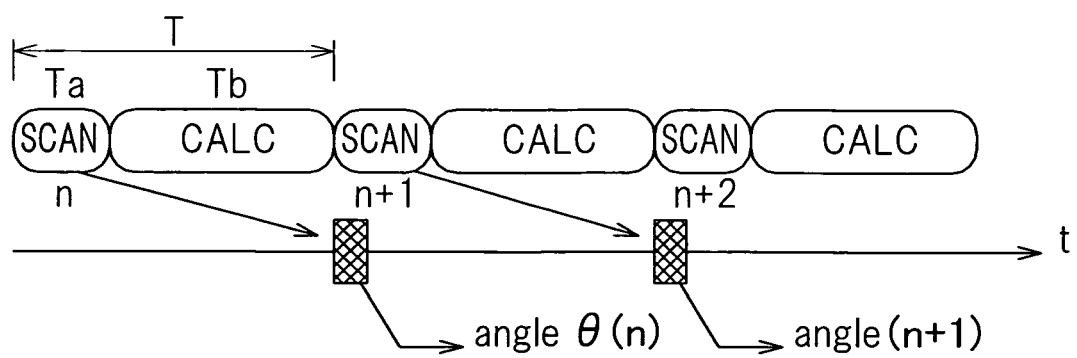
FIG. 13 is a timing chart showing the cycle of processing operation of detecting the angle of rotation with the rotation sensor and outputting it.

FIG. 13 illustrates a timing chart showing the cycle of process operation in which a magnetic sensor circuit 50 (FIG. 14) including the magnetic sensor arrays 5A to 5D and the angle calculating unit 61 detects and then outputs the rotational angle θ. During the first division Ta of the period T of one cycle, the magnetic sensor arrays 5A to 5D, which is the magnetic sensor 5 of the rotation sensor 3A, performs a sampling of the magnetic field of the magnet 2 on the rotating side and, during the latter division Tb of such cycle, the angle calculating unit 61 calculates and then outputs the rotational angle θ from the sampled value. In this way, since there is a time delay before the angle data are calculated, the actual rotational angle of the rotary shaft 10 at the time the data on the rotational angle are read in may possibly differ from the data read out.

The rotational speed calculating section 62 (FIG. 14) in the calculating circuit segment 6A calculates the rotational speed ω of the rotary shaft 10 by determining the amount of change thereof from the data on the rotational angle θ outputted from the angle calculating unit 61 for each time T as hereinabove described.

The magnetic data that can be obtained by sampling for each time that is performed by the magnetic sensor arrays 5A to 5D shown in FIG. 14 are inputted to the angle calculating unit 61 after having been amplified and then AD converted. The angle calculating unit 61 performs a calculation process shown in FIGS. 4 and 5 on the basis of the sampled value for each time performed by the magnetic sensor arrays 5A to 5D and then calculates the rotational angle θ according to the equation (1) each time the calculation process is performed.

On the other hand, the rotational speed calculating section 62 calculates the rotational speed ω and the direction of rotation, using the amount of change of the rotational angle data θ, outputted each time from the angle calculating unit 61 at each time T, and the time T elapsed during that period, which is determined by the timer 65. The calculation of the rotational speed ω is carried out in the following manner.

Assuming that the rotational angle θ(n) that is sampled each time changes, the rotational speed ω can be determined as expressed by the following equation (4) from the amount of change in angle during the continuous sampling period:

$$\omega = \{\theta(n+1) - \theta(n)\}/T \qquad (4)$$

where θ(n) and θ(n+1) represent the rotational angle determined at the n-th and (n+1)-th samplings, respectively.

In reference to the data on the rotational speed ω determined in the manner described above and the elapsed time determined by the timer 65, the angle time delay correcting section 63 corrects the rotational angle θ calculated by the angle calculating unit 61. In other words, the angle time delay correcting section 63 performs the following equation (5) to conjecture how much the rotational angle θ changes during the period Tb required for the angle calculating unit 61 to calculate the rotational angle θ(n) when the rotary shaft 10 is rotated at a rotational speed ω calculated by the rotational speed calculating section 62:

$$\theta(n+Tb)=\theta(n)+\omega\times Tb \qquad (5)$$

where θ(n+Tb) represents the rotational angle at the time the calculation performed by the angle calculating unit 7 subsequent to the n-th sampling completes.

Since this rotational angle detecting device 1 is of a construction in which the rotation of the magnet 2 provided at a shaft end of the rotary shaft 10 is detected by the rotation sensor 3, the rotary shaft 10, which is a rotatable body, is in a condition in which the rotational speed ω will hardly undergo an abrupt change under the influence of an inertia of the rotary shaft 10 and, hence, with the above described rotational angle correction, the rotational angle can be conjectured with high accuracy.

In the illustrated instance, since as a part of the large integrated circuit integrated on the semiconductor chip 4, the rotational speed calculating section 62 and the angle time delay correcting section 63 are provided together with the angle calculating unit 61, the data on the rotational angle θ outputted from the semiconductor chip 4 will represents the rotational angle at that time and, accordingly, the rotational angle detecting device 1 will be easy to handle in controlling in various machines and equipments which operate in receipt of those data.

It is to be noted that the rotational speed calculating section 62 and the angle time delay correcting section 63 may be provided separately from the semiconductor chip 4.

FIG. 15 illustrates a block diagram showing the construction of the rotational angle conjecturing unit 64 employed in the calculation circuit unit 6A. In FIG. 15, a rotational angle detecting circuit 60 corresponds to a circuit unit including the angle calculating unit 61, the rotational speed calculating section 62, the timer 65 and the angle time delay correcting section 63, all shown in FIG. 14. The rotational angle data θ, the time delay of which has been corrected, which have been obtained from the rotational angle detecting circuit 60, are discrete data outputted at intervals of the predetermined time T as hereinbefore described and, therefore, no angle information can be obtained more minutely than the interval during which the data are updated.

Figure 16:
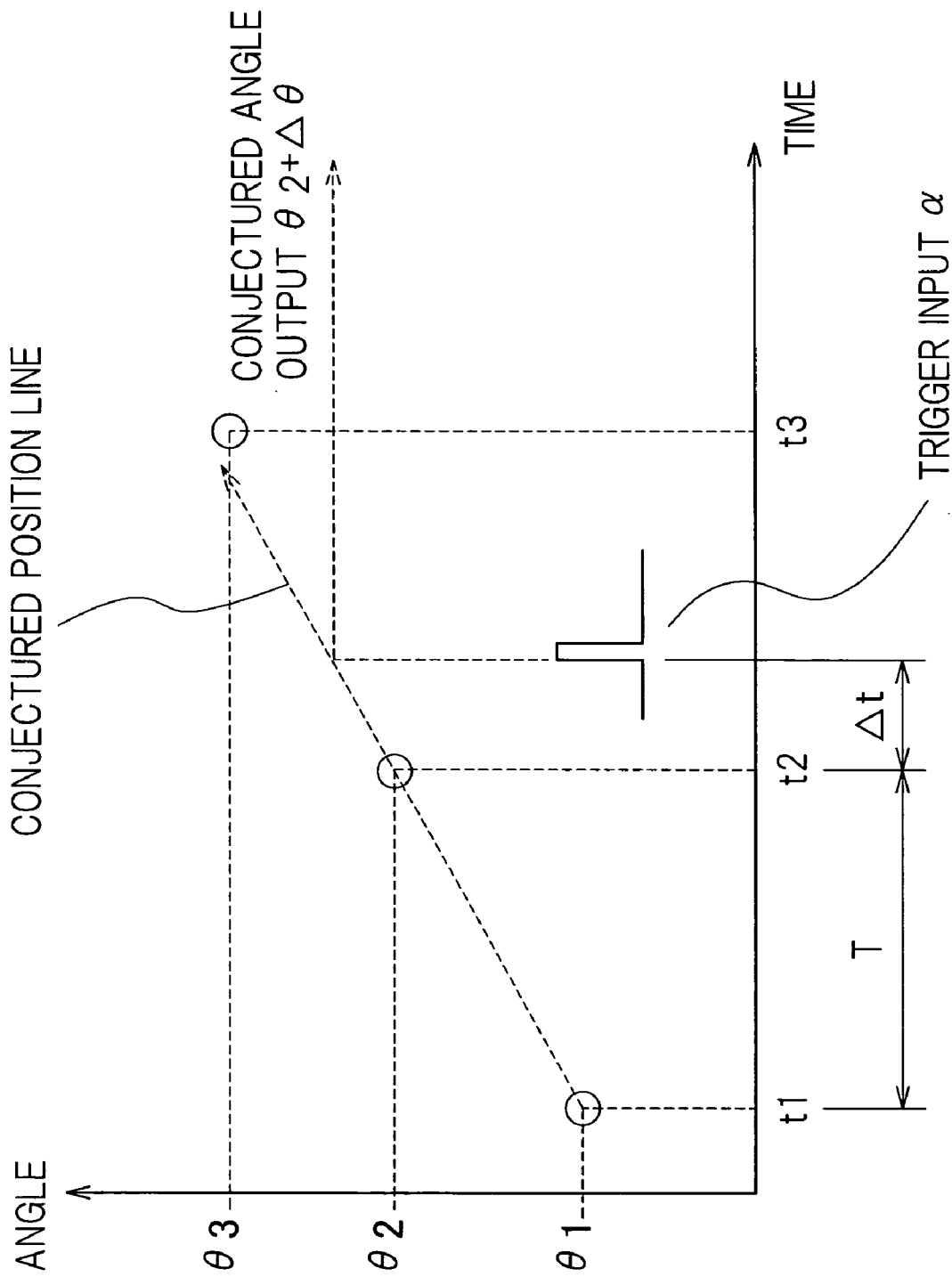
FIG. 16 is an explanatory diagram showing the processing operation of the angle conjecturing unit.

In view of the above, the rotational angle conjecturing unit 64 performs interpolation by inferring the angle value at the timing, at which the rotational angle data are requested, from the rotational angle data θ and the rotational speed ω and includes a timer 66, a memory 67 and an angle data interpolation processing circuit 68. More specifically, as shown in FIG. 16, the angle data interpolation processing circuit 68 of the rotational angle conjecturing unit 64 performs such a process as to cause the timer 66 to measure the time Δt passed subsequent to the timing t2, at which the recent rotational angle data (for example, θ2) outputted from the rotational angle detecting circuit 60 is outputted and until a request trigger a is received, and then to add the amount of change of an angle that can be conjectured from the rotational speed ω to the data. In other words, the angle data interpolation processing circuit 68 causes the rotational angle data θ, the rotational speed ω and the elapsed time to be stored in the memory 67 and then conjectures the rotational angle θ at the time when the request trigger signal a is received from those values. As a result, the rotational angle data θ2+Δθ at the timing t2+Δt which the request trigger a is inputted can be outputted from the angle data interpolation processing circuit 68. In other words, the rotational angle at any arbitrarily chosen timing can be accurately detected and then outputted even in a condition in which the rotary shaft 10 is rotating and in a condition in which the rotary shaft 10 is halted. The rotational angle θ calculated by the calculating circuit segment 6A is outputted through the output cable 29 (FIG. 1).

In the instance now under discussion, since as a part of the large integrated circuit integrated on the semiconductor chip 4, the rotational angle conjecturing unit 64 is provided together with the angle calculating unit 61, the rotational speed calculating section 62 and the angle time delay correcting section 63 shown in FIG. 14, a compact and highly accurate rotation sensor 3A capable of securing an accurate rotational angle information at any arbitrarily chosen timing can be constructed, allowing the compact rotational angle detecting device 1 to be realized.

It is to be noted that the rotational angle conjecturing unit 64 may be provided separately from the semiconductor chip 4. Also, although in the foregoing example, the use of the semiconductor sensor utilizing the magnetic sensor arrays has been shown and described as the magnetic sensor, effects similar to those described above can be equally obtained even when a semiconductor sensor such as, for example, a vector type magnetic sensor capable of detecting the direction of the magnetic field is employed.

Also, with the detector incorporated bearing assembly 20 shown in and described with particular reference to FIG. 1, since the rotational angle detecting device 1 is incorporated in the rolling bearing assembly 20, the number of component parts used in the machines utilizing the rolling bearing assembly and the number of assembling steps can be reduced to achieve downsizing.

Figure 17:
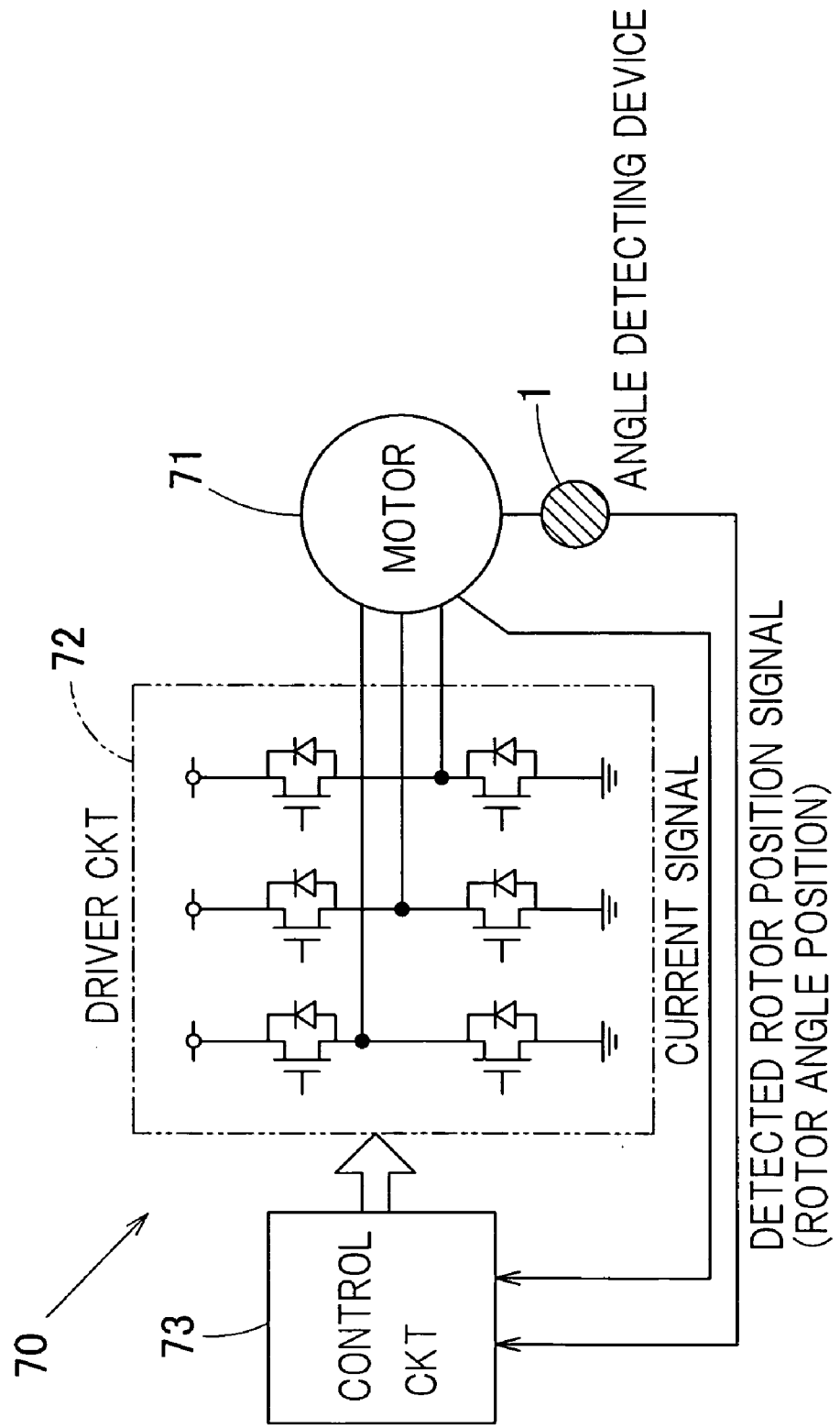
FIG. 17 is a block diagram showing a schematic construction of one example of a drive device for the motor having the rotational angle detecting device incorporated therein.

FIG. 17 illustrates a block diagram showing an example of the schematic construction of a rotation control device for a motor such as, for example, a servo motor or a brushless motor, in which the rotational angle detecting device 1 of the construction described above is incorporated. This motor rotation control device 70 includes the rotational angle detecting device 1, a driver circuit 72 for switching an energizing current to be applied to a stator coil for rotating a motor 71 in dependence on the detected value of the rotational angle outputted from this detecting device 1, and a control circuit 73 for adjusting the timing of the switching of the energizing current to control a rotating condition of the motor. In the illustrated example, the stator coil is rendered to be three phases and the switching of the energizing current to the stator coil of each phase is carried out by the driver circuit 72. The control circuit 73 performs a switching control on the energizing current based on the rotational angle θ of the motor 71 detected by the rotational angle detecting device 1 and, also, an advance control of the energizing current by feeding back the energizing current flowing through the stator coil. In particular, with the rotational angle detecting device 1 of the construction described above, it is possible to accurately ascertain the position of the magnetic poles of the motor at any arbitrarily chosen timing and, therefore, minute control appropriate to the rotational speed and the angle of rotation of the rotor can be effective where, for example, the efficiency of the motor and/or is desired to be increased and/or sounds of rotation are desired to be suppressed. In such case, a highly accurate detection of the angle can be accomplished with the compact rotational angle detecting device 1 and the device can be downsized and can have an increased performance.

Figure 18:
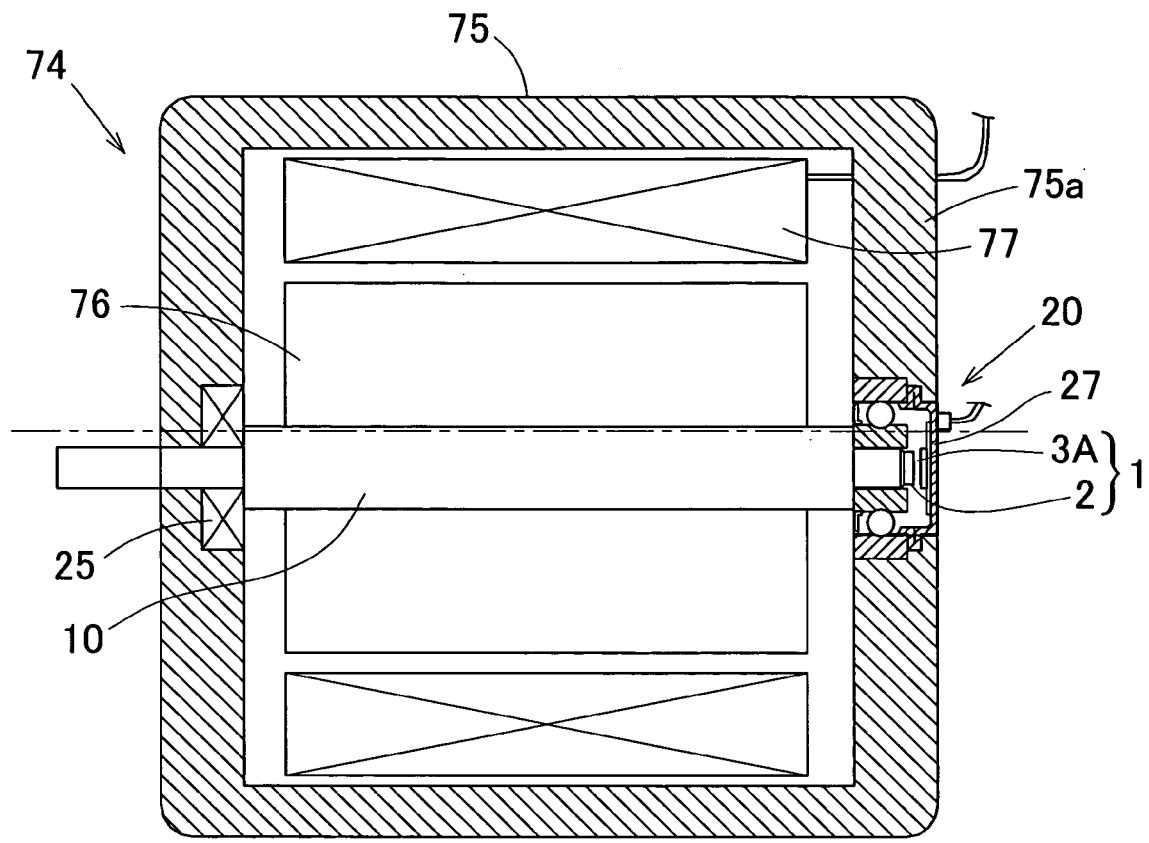
FIG. 18 is a sectional view showing one example of a brushless motor having the rotational angle detecting device incorporated therein.

FIG. 18 illustrates an example, in which the detector incorporated bearing assembly 20 shown in and described with particular reference to FIG. 1 is incorporated in a shaft end of the rotary shaft 10 of a brushless motor 74. The brushless motor 74 includes a cylindrical motor housing 75 having its opposite end closed, a rotary shaft 10 arranged coaxially in the motor housing 75, a rotor 76 mounted on this rotary shaft 10, and a stator 77 provided in an inner peripheral surface of a motor housing peripheral wall 75a in radially face-to-face relation with the rotor 76. The rotary shaft 10 is rotatably supported by the detector incorporated bearing assembly 20 and another bearing assembly 25 at the opposite ends of the motor housing 75.

In this case, since the rotational angle detecting device 1 is integrated with the bearing assembly 20, it is compact and does not require an assembling adjustment, the number of assembling steps is reduced and, hence, it has a high convenience.

Figure 19:
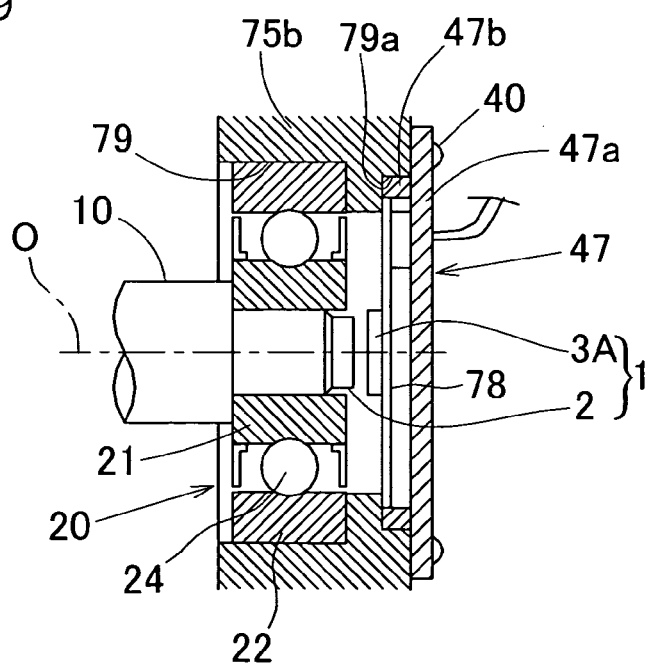
FIG. 19 is a fragmentary enlarged sectional view showing another example of the brushless motor having the rotational angle detecting device incorporated therein.

FIG. 19 illustrates another example, in which the rotational angle detecting device 1 referred to above is incorporated in the shaft end of the rotary shaft 10 of the brushless motor 74. In this instance, in place of the sensor carrier member 47 fitted to the outer race 22 of the bearing assembly 20, a sensor carrier member 47 is fitted to a bearing mounting area 79 formed in the motor housing end wall 75b and the rotation sensor 3A is fitted to this sensor carrier member 47 through a circuit substrate 78. In other words, in this example, the rotational angle detecting device 1 is completely separated from the bearing assembly 20. The bearing mounting area 79 referred to above has a step 79a formed therein in coaxial relation with the axis of rotation O of the rotary shaft 10, and the rotation sensor 3A (FIG. 1) is arranged in coaxial relation to the rotary shaft 10 with an annular projection 47b, provided in a rear surface of a body 47a of the sensor carrier member 47, engaged in this bearing mounting area 79. The sensor carrier member 47 is fixed to the motor housing end wall 75b by engaging the annular projection 47b with the step 79a of the bearing mounting area 79 and fastening the sensor carrier member 47a with mounting screws 40. In such case, since the axial position of the rotation sensor 3A relative to the bearing assembly 20 is fixed and the axial position of the magnet 2 relative to the bearing assembly 20 when the rotary shaft 10 is mounted in the inner race 21 of the bearing assembly 20 is also fixed, the axial gap in the rotation sensor 3A and the magnet 2 can be set to a size within a required range.

Figure 20:
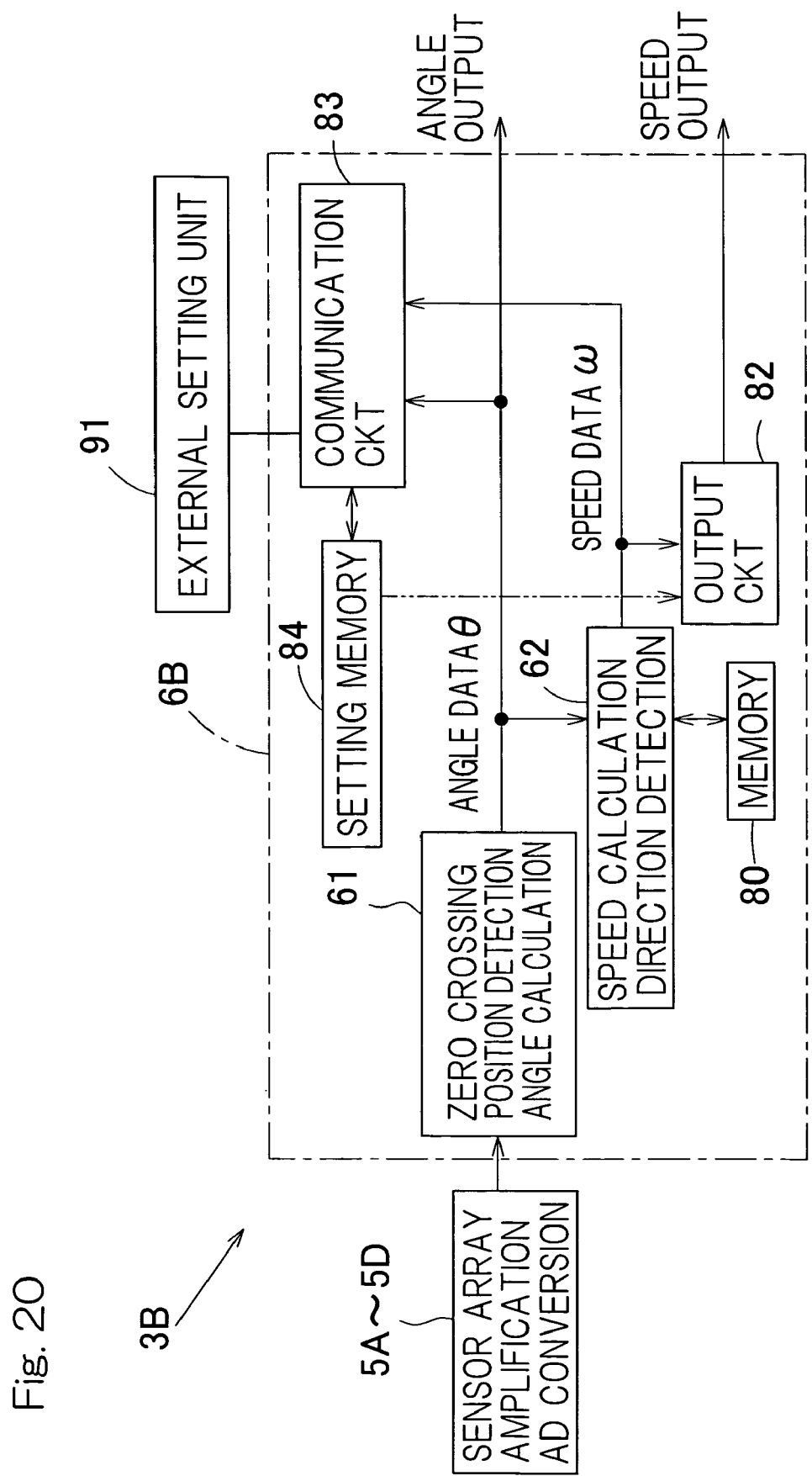
FIG. 20 is a block diagram showing the circuit construction of the rotation sensor according to an example of application of the present invention.

Although in any one of the foregoing embodiments of the present invention, the "delay time compensation" has been an essential requirement, examples of application which does not require it as an essential requirement will be hereinafter described. The semiconductor chip forming the rotation sensor 3B in the examples of application is of a construction substantially similar to that forming the rotation sensor 3A shown in and described with particular reference to FIG. 12, and the angle calculating process (FIG. 4) performed by the angle calculating unit of this rotation sensor 3A, the output waveforms (FIG. 5) of the magnetic sensor arrays in the rotation sensor array 3A and the timing chart (FIG. 13) of the cycle of processing operation of the rotation sensor 3A to detect and output the rotational angle are also similar, and accordingly the details thereof are not reinstated. Even in this example of application, as is the case with any one of the foregoing embodiments, by means of the rotational angle calculating process shown in and described with reference to FIGS. 4 and 5, where the zero crossing positions X1 and X2 lie on, for example, the magnetic sensor arrays 5B and 5D, the rotational angle θ is calculated in a manner similar to that described hereinbefore through the data on the zero crossing positions obtained from the outputs therefrom. FIG. 20 illustrates a block diagram showing the circuit construction of a rotation sensor 3B. The rotational angle θ is calculated by a calculating circuit segment 6B and outputted through the output cable 29 (FIG. 1) or a serial communication circuit 83 as will be described later.

In other words, the magnetic data sampled by the magnetic sensor arrays 5A to 5D are, after having been amplified and then AD converted, inputted to the calculation circuit unit 6. The angle calculating unit 61 in the calculating circuit segment 6B performs such a calculating process as shown in FIGS. 4 and 5 to detect the rotational angle θ based on the sampled values of the magnetic sensor arrays 5A to 5D.

On the other hand, the rotational speed calculating section 62 of the calculating circuit segment 6B stores the data on the rotational angle θ, outputted from the angle calculating unit 61 each time at intervals of time T, in a memory 80, calculates a change of such data and then determines the rotational speed ω and the direction of rotation. The calculation thereof is carried in the following manner.

Where the sampled rotational angle θ(n) for each time undergoes a change, the rotational speed ω can be determined as shown by the following equation (6), from a changed angle during the continued sampling period.

$$\omega = \{\theta(n+1) - \theta(n)\}/T \qquad (6)$$

where θ(n) and θ(n+1) represent the respective rotational angles determined during the n-th and (n+1)-th samplings.

Where the rotational speed is low and the rotational angle θ(n) does not change during each sampling, the rotational speed ω can be obtained as expressed by the following equation (7) from the amount of change in angle during several to some tenth samplings.

$$\omega = \{\theta(n+m) - \theta(n)\}/mT \qquad (7)$$

where θ(n+m) represents the rotational angle determined during the (n+m)-th sampling.

The data on the rotational speed ω so determined in the manner described above are inputted to an output circuit 82, which is a speed signal output unit, and is, after having been converted into a rotational speed signal of a predetermined signal pattern, outputted to the outside. Setting of the output signal pattern thereof can be carried out by storing in a setting memory 84, which is a setting content storage section, from an external setting unit 91, provided outside the rotation sensor 3B, through the serial communication circuit 83. The setting memory 84 includes a nonvolatile memory. In the instance now under discussion, the serial communication circuit 83 is provided as a part of the calculating circuit segment 6B comprises of a large scale integrated circuit formed on the semiconductor chip 4 together with the magnetic sensor arrays 5A to 5D, but the serial communication circuit 83 may be provided outside of the semiconductor chip 4.

Figure 21:
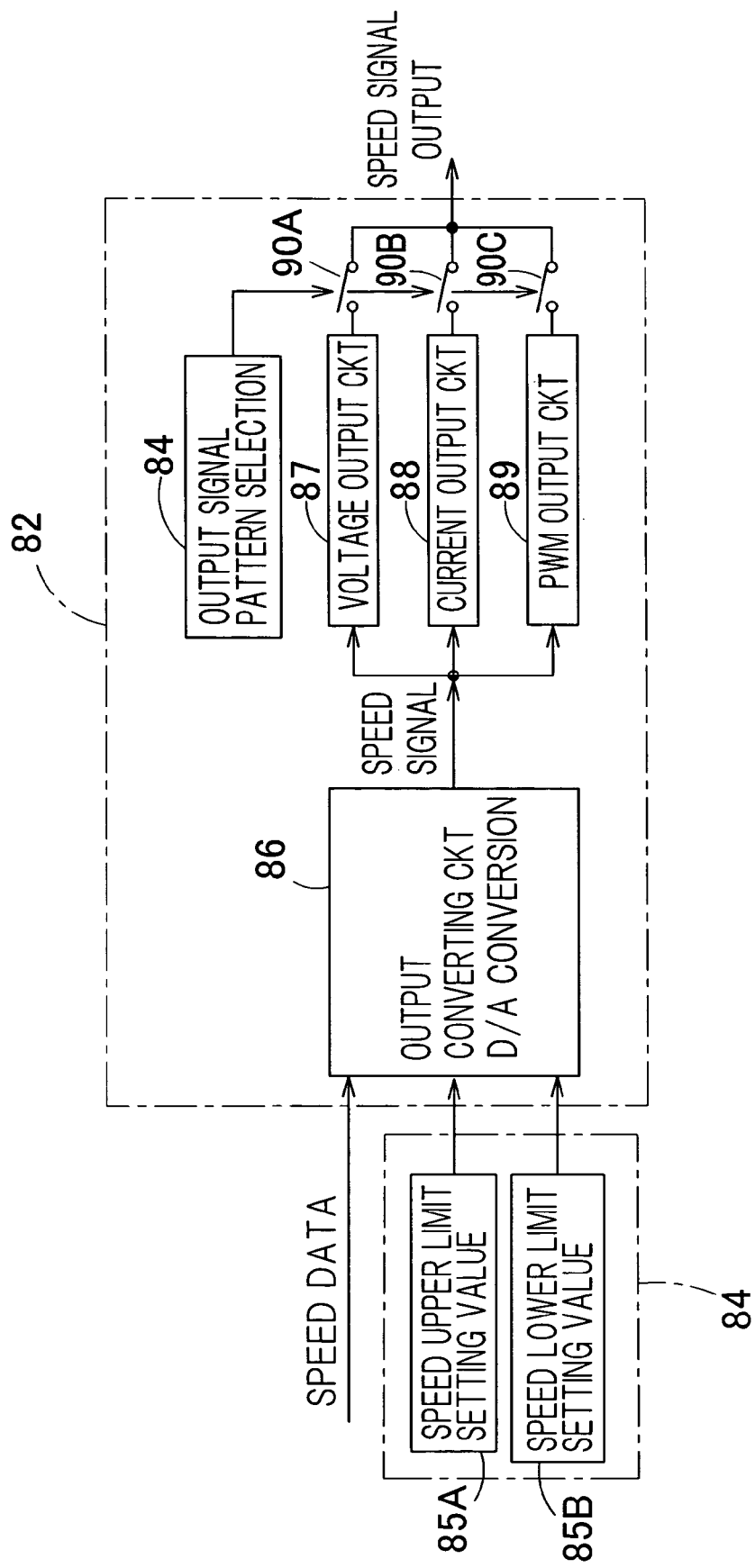
FIG. 21 is a block diagram showing the details of an output circuit shown in FIG. 20.
Figure 22:
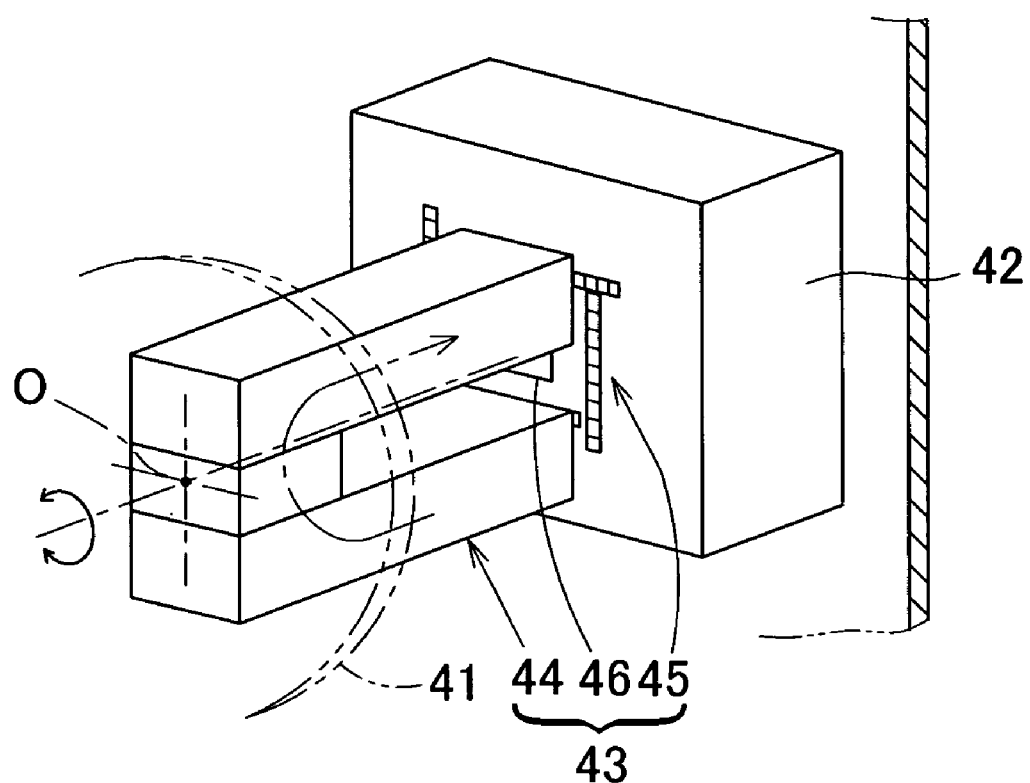
FIG. 22 is a perspective view of the conventional example.

FIG. 21 illustrates a block diagram showing the detail of the output circuit 82 shown in FIG. 20. The setting memory 84 referred to above is so designed as to store not only the output signal pattern, but also the speed upper limit setting value 85A, a speed lower limit setting value 85B and a setting value (which specifies a logarithmic conversion or a linear conversion) of a conversion calculating system (not shown) from the external setting unit 91 (FIG. 20) through the serial communication circuit 83, so that when it is powered on, those setting values can be read out. In dependence on the speed upper limit setting value 85A, the speed lower limit setting value 85B and the conversion calculating system, an output converting circuit 86 of the output circuit (speed signal output unit) 82 converts the data on the rotational speed ω, supplied from the rotational speed calculating section 62 (FIG. 20), into a rotational speed signal. The signal outputted may be either a digital signal or an analog signal. By way of example, conversion is so made that the rotational speed of 5000 rpm is rendered by the upper limit value setting 85A to correspond to a voltage of 5 V and a halted condition is rendered by the lower limit setting 85B to correspond to a voltage of 0 V, and the value during that time is rendered to correspond to a linear form.

The rotational speed signal so converted is outputted to the outside after having been switched into a form of voltage output, current output or PWM output when one of a voltage output circuit 87, a current output circuit 88 or a PWM output circuit 89 is selected by selectively switching one of switches 90A to 90C on in dependence on the form of output signal set by the setting memory 84, respectively. By way of example, where the voltage output is selected, a voltage proportional to the rotational speed ω is outputted and, therefore, it can be used in a manner similar to a tacho-generator. Also, if the current output is set where there are many sources of noises in the environment of the rotational angle detecting device 1, the current variable in proportion to the rotational speed ω is outputted, and, therefore, it will assume a signal pattern less susceptible to influences brought about by the noises. In such case, since the setting memory 84 includes a nonvolatile memory, the various setting values once set can be used in the form as presented at all times.

Also, in this example of application, the data on the rotational speed ω are allowed to be outputted to the outside through the serial communication circuit 83. Accordingly, the serial communication circuit 83 cooperates with the output circuit 82 to constitute a speed signal outputting unit for outputting the signal indicative of the rotational speed ω to the outside.

As hereinabove described, since the rotational angle detecting device 1 equipped with this rotational signal output is provided with the rotational speed calculating section 62 for calculating the rotational speed ω from the time dependent change of the rotational angle θ detected by the angle calculating unit 61 and, also, with the speed signal outputting unit (output circuit) 82 for outputting the signal indicative of the rotational speed ω calculated by the rotational speed calculating section, the information on the rotational speed ω, which has not been unable to be detected according to the prior art unless a microcomputer or a calculation processing circuit that is separately installed is used, can be outputted together with the information on the rotational angle θ from the single rotational angle detecting device 1 and, therefore, it can be rendered to be a highly convenient detecting device.

Also, since in this example of application, the speed signal outputting unit 82 is so designed that the pattern of the signal indicative of the rotational speed ω that is outputted therefrom can be switchable by the setting, the rotational speed signal can be drawn out in an output form appropriate to the environment to be used or the machine to be connected and, therefore, it can accommodate widely depending on the way of use.

Yet, since the external setting unit 91 is employed, which enables settings associated with the conversion or output of the speed signal outputting unit 82 to be set from the outside through communication, such settings can easily be changed from the outside and the single rotational angle detecting device 1 can be used in various fields of application.

In addition, with the detector incorporated bearing assembly 20 having incorporated therein the rotational angle detecting device equipped with the rotational speed signal output as hereinabove described, the number of component parts of the bearing utilizing machine and the number of assembling steps can be reduced and downsizing is also accomplished. In such case, since the rotational angle detecting device 1 can detect the rotational angle θ and the rotational speed ω, it can be used in a wide range of application.

The foregoing examples of application have the following modes:

[Mode 1]

The rotational angle detecting device equipped with the rotational speed signal output in accordance with this Mode 1 is a rotational angle detecting device which includes a magnet mounted on a rotary shaft axial end of a rotating member rotatable relative to a stationary member and having a pair of magnetic poles formed therein; a magnetic sensor arranged on the stationary member so as to confront the magnet in an axial direction and including a large scale integrated circuit; and an angle calculating unit for detecting the angle of rotation of the rotating member from an output of each of the magnetic sensor; in which device a rotational speed calculating section for calculating a rotational speed from a time dependent change of the rotational angle detected by the angle calculating unit and a speed signal output unit for outputting a signal indicative of the rotational speed calculated by the rotational speed calculating section are provided. According to the above described construction, based on the output from the magnetic sensor, the angle calculating unit detects the rotational angle of the rotating member and the rotational speed calculating section calculates the rotational speed from the time dependent change of the rotational angle detected by the angle calculating unit. The signal indicative of the rotational speed is outputted from the speed signal output unit. Because of this, the information on the rotational speed, which has hitherto been unable to be detected unless the external circuit such as, for example, the microcomputer and/or the calculation processing circuit provided separately is used, can be outputted from the single rotational angle detecting device together with the information on the rotational angle, thus resulting in the highly convenient detecting device.

[Mode 2]

In the Mode 1 referred to above, the magnetic sensor including the large scale integrated circuit may be a magnetic sensor array. With the magnetic sensor array, an accurate angle detection can be achieved compactly.

[Mode 3]

In the Mode 1 referred to above, it may have a serial communication circuit which will become the speed signal outputting unit.

[Mode 4]

In the Mode 1 referred to above, the speed signal outputting unit is of a design in which the speed, which is a result of calculation performed by the rotational speed calculating section, is converted so as to be variable between a predetermined uppermost limit and a predetermined lower limit. In the case of such construction, such a conversion is possible, in which, for example, with setting of the upper limit value, the rotational speed of 5000 rpm may correspond to a voltage of 5 V and, with setting of the lower limit value, it may correspond to a halted condition and values between those limit values may correspond to a linear form.

[Mode 5]

In the Mode 4 referred to above, the speed signal outputting unit may be of a type capable of switching the system of conversion of the signal indicative of the rotational speed that is to be outputted to one of a linear conversion and a logarithmic conversion depending on the setting.

[Mode 6]

In the Mode 1 referred to above, the speed signal outputting unit may be of a type capable of switching the pattern of the signal indicative of the rotational speed that is to be outputted.

In the case of this construction, depending on the environment of use and the machine to be connected with, it can accommodate widely.

[Mode 7]

In the Mode 1 referred to above, the speed signal outputting unit is such that the pattern of the signal indicative of the rotational speed that is to be outputted may include at least two of a voltage output, a current output and a PWM (Pulse Width Modulation) output. It may include at least two of the PWM outputs. In the case of this construction, for example, when the voltage output is selected, the voltage proportional to the rotational speed is outputted and, therefore, it can be used in a manner similar to a tacho-generator. Also, if the current output is set where there are many sources of noises in the environment of the rotational angle detecting device, the current variable in proportion to the rotational speed is outputted, and, therefore, it will assume a signal pattern less susceptible to influences brought about by the noises. With the PWM output, it will assume a signal pattern in which the output pulse width varies in dependence on the rotational speed.

[Mode 8]

In the Mode 1 referred to above, the setting pertaining to the conversion or outputting of the rotational speed calculating section or the speed signal outputting unit may be provided with an external setting unit that can be achieved from the outside through communication. The term "external" referred to here means outside of the speed signal outputting unit. In the case of this construction, the setting pertaining to the conversion or outputting of the speed signal outputting unit can be changed from the outside through communication, the single rotational angle detecting device can be used in various fields of application.

[Mode 9]

In the Mode 8 referred to above, a setting content storage section for storing the contents, set by the external setting unit, in a nonvolatile memory may be provided inside or outside the large scale integrated circuit forming the magnetic sensor and may be used as the set contents of the rotational speed calculating section or the speed signal outputting unit by reading the stored contents of the nonvolatile memory at the time it is powered on. In the case of this construction, when the contents set by the external setting unit are stored in the nonvolatile memory of the setting content storage section, the various setting values once set can be used as the set contents of the speed signal outputting unit at all times as they stand.

[Mode 10]

The detector incorporated bearing assembly according to this Mode 10 is the one in which the rotational speed signal output equipped rotational speed detecting device as referred to in Mode 1 is incorporated in a bearing assembly. According to this construction, the number of component parts of the bearing utilizing machine and the number of assembling steps can be reduced and downsizing can be achieved. In such case, since the rotational angle detecting device can detect both of the rotational angle and the rotational speed, it can be used in a wide range of application.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotational angle detecting device which comprises:
   a magnet mounted on a rotating member and having an anisotropy in a circumferential direction about the axis of rotation;
   a magnetic sensor arranged on a stationary member so as to confront the magnet in a direction along an axis of rotation of the rotating member and having a plurality of magnetic sensor elements arranged in a plane;
   an angle calculating unit for measuring an intensity of magnetic field of the magnet from an output of each of the magnetic sensor elements and for detecting the angle of rotation of the rotating member based on the measured value; and
   a delay time correcting unit for correcting a delay time occurring between the detection of the magnetic field of the magnet by means of the magnetic sensor elements and an output of a detected angle from the angle calculating unit.

2. The rotational angle detecting device as claimed in claim 1, wherein the magnet is arranged in a rotary shaft end of the rotating member and has a pair of magnetic poles formed therein.

3. The rotational angle detecting device as claimed in claim 1, further comprising an interpolation unit for interpolating an interval of sampling of magnetic fields conducted by the magnetic sensor to calculate an amount of change of an angle and an output unit for outputting a rotational angle which has been corrected as to a delay time by the delay time correcting unit and interpolated by the interpolation unit.

4. The rotational angle detecting device as claimed in claim 1, further comprising a pulse generating circuit for generating a rotation pulse signal from an output of the magnetic sensor, and wherein the output unit outputs the output of the rotational angle in a form of a pulse signal.

5. The rotational angle detecting device as claimed in claim 4, wherein the pulse signal is made up of two rotation pulse signals that are displaced 90° in phase from each other, or made up of a rotation pulse signal and a rotational direction signal.

6. The rotational angle detecting device as claimed in claim 4, further comprising an index signal generating section for outputting from the output of the magnetic sensor, an index signal for each complete rotation of the rotating member.

7. The rotational angle detecting device as claimed in claim 6, further comprising a storage section for storing an angle value for outputting the index signal and an angle value setting section for setting the angle value for outputting the index signal.

8. The rotational angle detecting device as claimed in claim 1, further comprising a function ON/OFF unit for selectively switching a function of each of the delay time correcting unit and the interpolation unit on or off.

9. The rotational angle detecting device as claimed in claim 8, further comprising an automatic switching section for switching the delay time correcting unit on or off in dependence on whether or not the rotational speed of the rotating member is equal to or higher than a predetermined speed, such that when the rotational speed of the rotating member is not higher than the predetermined rotational speed, the delay time correcting unit is switched off.

10. The rotational angle detecting device as claimed in claim 1, wherein the delay time correcting unit comprises a rotational speed calculating section for calculating the rotational speed from a time dependent change of the rotational speed detected by the angle calculating unit, and an angle time delay correcting section for correcting a time delay of the rotational angle between detection of the magnetic field by the magnetic sensor and an output of the rotational angle from the angle calculating unit, in reference to the rotational speed calculated by this rotational speed calculating section.

11. The rotational angle detecting device as claimed in claim 10, further comprising a rotational angle conjecturing unit for obtaining the rotational angle, which has been corrected by the angle time delay correcting section, at intervals of a predetermined time and for conjecturing the rotational angle of the rotary shaft at any arbitrarily chosen time based on a rotational angle information at the intervals of the predetermined time and information on the rotational angle calculated by the rotational speed calculating section.

12. The rotational angle detecting device as claimed in claim 10, further comprising a large scale integrated circuit forming the magnetic sensor, and wherein the angle calculating unit, the rotational speed calculating section and the angle time delay correcting section are all integrated on such large scale integrated circuit.

13. A rotational angle detecting device incorporated bearing assembly comprising a rotational angle detecting device as defined in claim 1 incorporated in a bearing assembly including rolling elements interposed between a rotating member and a stationary member.

14. A motor rotation control device which comprises a rotation angle detecting device as defined in claim 1 and a control circuit for controlling in response to an output of the rotational angle detecting device and indicative of a rotational angle to control an energizing current and an energizing timing for a motor.

* * * * *